(12) United States Patent
Takeuchi et al.

(10) Patent No.: US 9,683,907 B2
(45) Date of Patent: Jun. 20, 2017

(54) PHYSICAL QUANTITY SENSOR, ALTIMETER, ELECTRONIC APPARATUS, AND MOVING OBJECT

(71) Applicant: Seiko Epson Corporation, Tokyo (JP)

(72) Inventors: Junichi Takeuchi, Chino (JP); Takuya Kinugawa, Chino (JP)

(73) Assignee: Seiko Epson Corporation (JP)

(*) Notice: Subject to any disclaimer, the term of this patent is extended or adjusted under 35 U.S.C. 154(b) by 92 days.

(21) Appl. No.: 14/666,859

(22) Filed: Mar. 24, 2015

(65) Prior Publication Data
US 2015/0276527 A1 Oct. 1, 2015

(30) Foreign Application Priority Data
Mar. 25, 2014 (JP) ................................. 2014-062778

(51) Int. Cl.
G01L 9/00 (2006.01)
G01L 9/06 (2006.01)

(52) U.S. Cl.
CPC ............. G01L 9/0052 (2013.01); G01L 9/06 (2013.01)

(58) Field of Classification Search
None
See application file for complete search history.

(56) References Cited

U.S. PATENT DOCUMENTS 5,614,678 A * 3/1997 Kurtz .................... G01L 9/0055
338/42
6,006,607 A * 12/1999 Bryzek ................. G01L 9/0054
338/42
7,219,554 B2 * 5/2007 Fujimoto ............. G01L 19/069
257/419
7,252,008 B2 * 8/2007 Muchow ............... G01L 9/0054
73/721
7,448,278 B2 * 11/2008 Hsieh .................... G01L 9/0054
438/53
2008/0163695 A1 7/2008 Ichikawa
2013/0015537 A1 * 1/2013 Nowak ................. G01L 9/0042
257/415
2015/0114129 A1 * 4/2015 Chen .................... G01L 19/0618
73/721

(Continued)

FOREIGN PATENT DOCUMENTS

JP 02-057933 A 2/1990
JP 2006-003099 A 1/2006

OTHER PUBLICATIONS

Suematsu, "New Type Sensors Using MEMS Technology", Fujikura Technical Report, vol. 2, No. 123, p. 68-70 (2012).

(Continued)

*Primary Examiner* — Andre Allen
(74) *Attorney, Agent, or Firm* — Harness, Dickey & Pierce, P.L.C.

(57) ABSTRACT

A physical quantity sensor includes a diaphragm which is able to be bent and deformed; and a bending amount element, provided in the diaphragm, which outputs a signal based on the amount of bending of the diaphragm. The bending amount element includes a center side element which is provided closer to the center of the diaphragm and an edge portion side element which is provided closer to an edge portion of the diaphragm than the center side element.

14 Claims, 18 Drawing Sheets

(56) References Cited

U.S. PATENT DOCUMENTS

| | | | | |
|---|---|---|---|---|
| 2015/0128713 A1* | 5/2015 | Kakoiyama | ........... | G01L 9/0052 73/721 |
| 2015/0168242 A1* | 6/2015 | Matsuzawa | ............. | H01L 27/07 257/419 |
| 2015/0219515 A1* | 8/2015 | Hayashi | ................... | G01L 19/08 73/384 |
| 2015/0268113 A1* | 9/2015 | Takeuchi | .............. | G01L 9/0054 73/721 |
| 2015/0268114 A1* | 9/2015 | Takeuchi | ................. | G01C 5/06 73/384 |
| 2016/0033347 A1* | 2/2016 | Hayashi | ................ | G01L 9/0054 73/723 |
| 2016/0153856 A1* | 6/2016 | Hayashi | ................ | G01L 9/0054 73/384 |
| 2016/0153857 A1* | 6/2016 | Matsuzawa | ........... | G01L 9/0054 73/727 |
| 2016/0209287 A1* | 7/2016 | Hirayama | ............... | G01L 19/04 |

OTHER PUBLICATIONS

Chiang Liu, "Chapter 6: Piezoresistive Sensors", Foundations of MEMS, p. 207-241, Prentice Hall (2005).

* cited by examiner

PHYSICAL QUANTITY SENSOR, ALTIMETER, ELECTRONIC APPARATUS, AND MOVING OBJECT

BACKGROUND

1. Technical Field

The present invention relates to a physical quantity sensor, an altimeter, an electronic apparatus, and a moving object.

2. Related Art

In recent years, sensors including a sensor element such as, for example, a piezoresistive element or a vibrator as a physical quantity sensor have been widely applied in fields such as industrial instrumentation and medicine because of their small size, light weight, and high sensitivity.

As such a physical quantity sensor, JP-A-2006-003099 discloses a pressure sensor including a diaphragm which is bent and deformed due to pressure reception and, for example, a piezoresistive element provided on the diaphragm. In such a pressure sensor, it is possible to detect pressure applied to the diaphragm on the basis of the amount of change in a resistance value of the piezoresistive element which occurs due to the bending of the diaphragm.

JP-A-2006-003099 discloses that the detection sensitivity of the physical quantity sensor is improved by disposing the piezoresistive element on an edge portion side of the diaphragm on which stress is likely to concentrate when the diaphragm is bent and deformed.

However, in such arrangement of the piezoresistive element, the amount of change in the resistance value of the piezoresistive element based on the deformation of the diaphragm cannot be sufficiently increased, and thus it is not possible to obtain the physical quantity sensor having a sufficiently high detection sensitivity.

SUMMARY

An advantage of some aspects of the invention is to provide a physical quantity sensor having high detection sensitivity and to provide an altimeter, an electronic apparatus, and a moving object which include the physical quantity sensor.

The invention can be implemented as the following forms or application examples.

Application Examples 1

A physical quantity sensor according to this application example includes a diaphragm which is able to be bent and deformed; and a bending amount element, provided in the diaphragm, which outputs a signal based on the amount of bending of the diaphragm. The bending amount element includes a center side element which is provided closer to the center of the diaphragm and an edge portion side element which is provided closer to an edge portion of the diaphragm than the center side element.

According to this configuration, it is possible to particularly increase the amount of change in a resistance value of the bending amount element and to provide the physical quantity sensor having high detection sensitivity.

Application Examples 2

In the physical quantity sensor according to the application example, it is preferable that the center side element and the edge portion side element are provided lined up toward the edge portion from the center of the diaphragm.

According to this configuration, it is possible to particularly increase the amount of change in a resistance value of the bending amount element. Therefore, it is possible to further improve the detection sensitivity of the physical quantity sensor.

Application Examples 3

In the physical quantity sensor according to the application example, it is preferable that magnitudes of stresses detected by the center side element and the edge portion side element are changed in mutually opposite directions when the amount of bending deformation of the diaphragm is changed.

According to this configuration, it is possible to particularly increase the amount of change in a resistance value of the bending amount element by providing the center side element to be closer to the center and providing the edge portion side element to be closer to the edge portion. Therefore, it is possible to further improve the detection sensitivity of the physical quantity sensor.

Application Examples 4

In the physical quantity sensor according to the application example, it is preferable that the center side element is located within a range of equal to or less than $2L/3$ from the center of the diaphragm when a distance between the center of the diaphragm and an outer edge of the diaphragm is set to be $L$.

A region within this range is a region where stress is applied in a direction in which the diaphragm is compressed when the diaphragm is bent and deformed and is a region where the amount of change in a resistance value of the center side element is particularly increased by pressure being applied to the diaphragm. Therefore, it is possible to further improve the detection sensitivity of the physical quantity sensor by providing the center side element within this range.

Application Examples 5

In the physical quantity sensor according to the application example, it is preferable that the center side element is located within a range of equal to or greater than $L/4$ and equal to or less than $L/2$ from the center of the diaphragm when a distance between the center of the diaphragm and an outer edge of the diaphragm is set to be $L$.

According to this configuration, it is possible to achieve an increase in the density of the center side element and to further improve the detection sensitivity of the physical quantity sensor.

Application Examples 6

In the physical quantity sensor according to the application example, it is preferable that the diaphragm has a quadrangular shape when seen in a plan view and that at least one center side element and at least one edge portion side element are provided within at least one of four regions separated by two diagonal lines.

According to this configuration, it is possible to particularly increase the amount of change in a resistance value of the bending amount element and to further improve the detection sensitivity of the physical quantity sensor.

Application Examples 7

In the physical quantity sensor according to the application example, it is preferable that at least one center side element and at least one edge portion side element are provided within each of the four regions.

According to this configuration, it is possible to more equally detect pressure applied to the diaphragm and to further improve the detection accuracy of the physical quantity sensor.

Application Examples 8

In the physical quantity sensor according to the application example, it is preferable that the center side element and the edge portion side element have a longitudinal shape when seen in a plan view, and a longitudinal direction of the center side element and a longitudinal direction of the edge portion side element intersect each other.

According to this configuration, it is possible to particularly increase the amount of change in a resistance value of the bending amount element and to further improve the detection sensitivity of the physical quantity sensor.

Application Examples 9

In the physical quantity sensor according to the application example, it is preferable that the center side element and the edge portion side element have a longitudinal shape when seen in a plan view, and a length of the center side element in a longitudinal direction is shorter than a length of the edge portion side element in a longitudinal direction.

According to this configuration, it is possible to achieve an increase in the density of the center side element and to further improve the detection sensitivity of the physical quantity sensor.

Application Examples 10

It is preferable that the physical quantity sensor according to the application example of the invention is a pressure sensor that detects pressure.

According to this configuration, it is possible to provide the pressure sensor having high detection sensitivity.

Application Examples 11

An altimeter according to this application example includes the physical quantity sensor according the application example of the invention.

According to this configuration, it is possible to provide the altimeter having high detection sensitivity.

Application Examples 12

An electronic apparatus according to this application example includes the physical quantity sensor according to the application example of the invention.

According to this configuration, it is possible to provide the electronic apparatus having high detection sensitivity.

Application Examples 13

A moving object according to this application example includes the physical quantity sensor according to the application example of the invention.

According to this configuration, it is possible to provide the moving object having high detection sensitivity.

BRIEF DESCRIPTION OF THE DRAWINGS

The invention will be described with reference to the accompanying drawings, wherein like numbers reference like elements.

FIG. 4A is a cross-sectional view showing a pressurized state; and FIG. 4B is a plan view showing the pressurized state.

DESCRIPTION OF EXEMPLARY EMBODIMENTS

Hereinafter, a physical quantity sensor, an altimeter, an electronic apparatus, and a moving object will be described in detail on the basis of embodiments shown in the accompanying drawings.

1. Physical Quantity Sensor

First Embodiment

Figure 1:
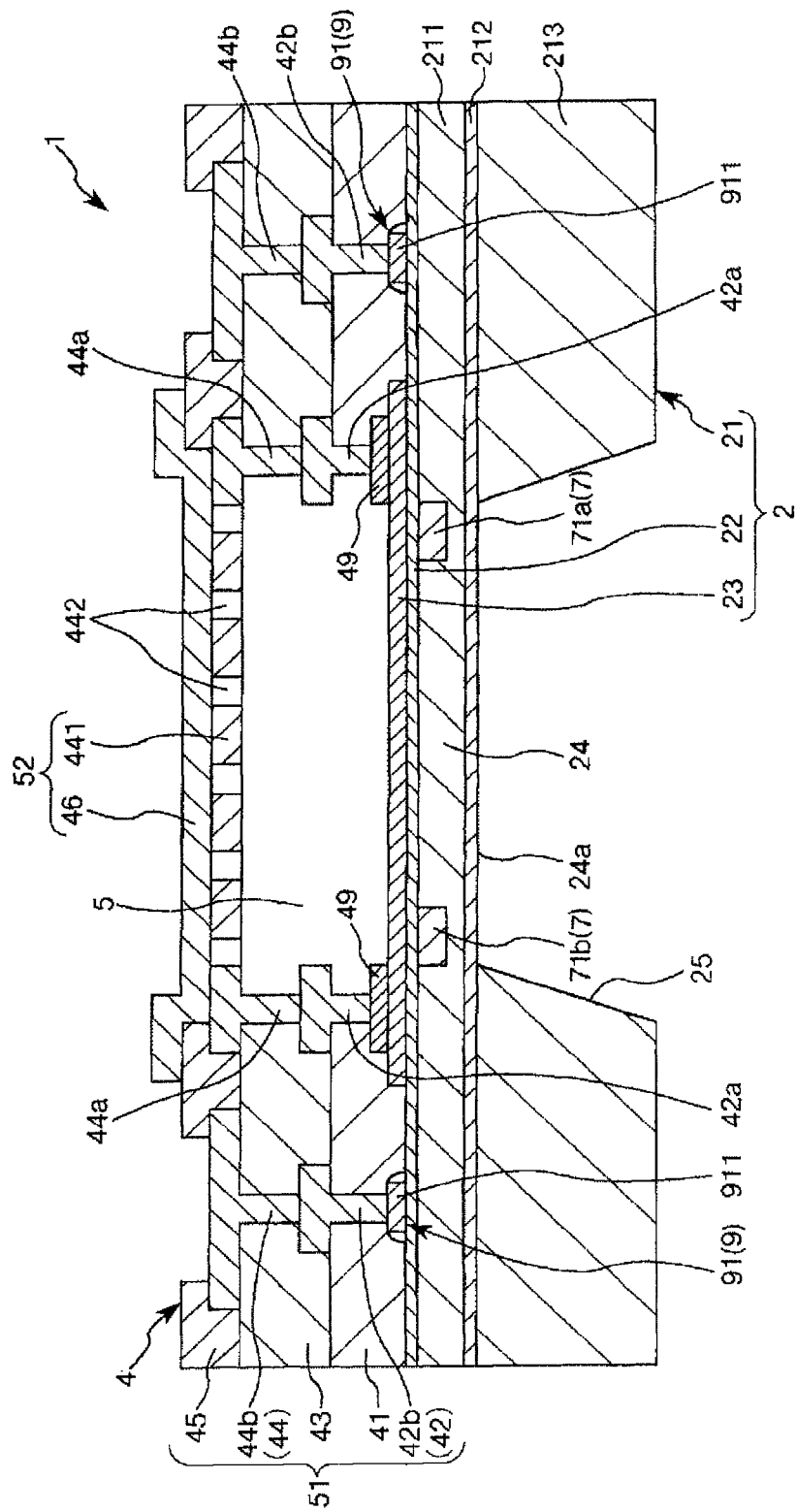
FIG. 1 is a cross-sectional view showing a physical quantity sensor according to a first embodiment of the invention.
Figure 2:
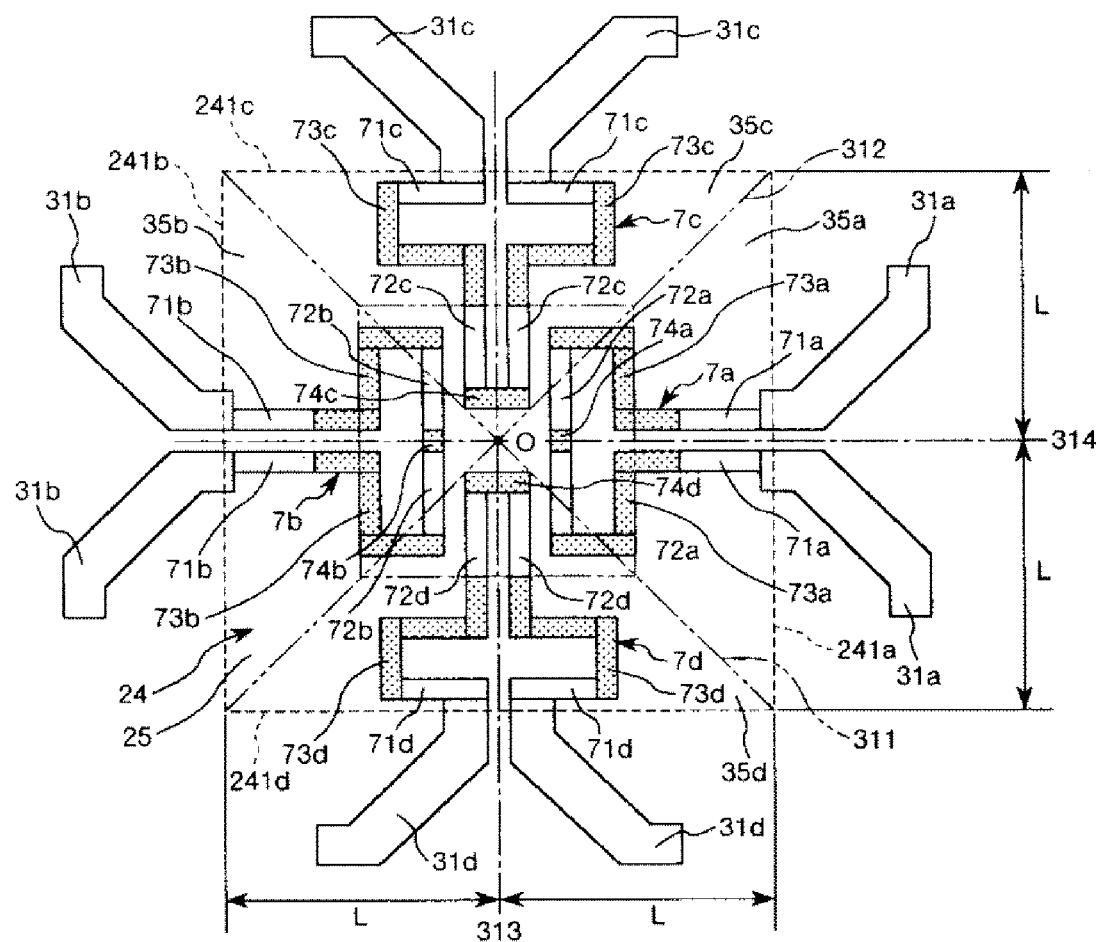
FIG. 2 is an enlarged plan view illustrating the arrangement of a sensor element (piezoresistive element) which is included in the physical quantity sensor shown in FIG. 1.
Figure 3:
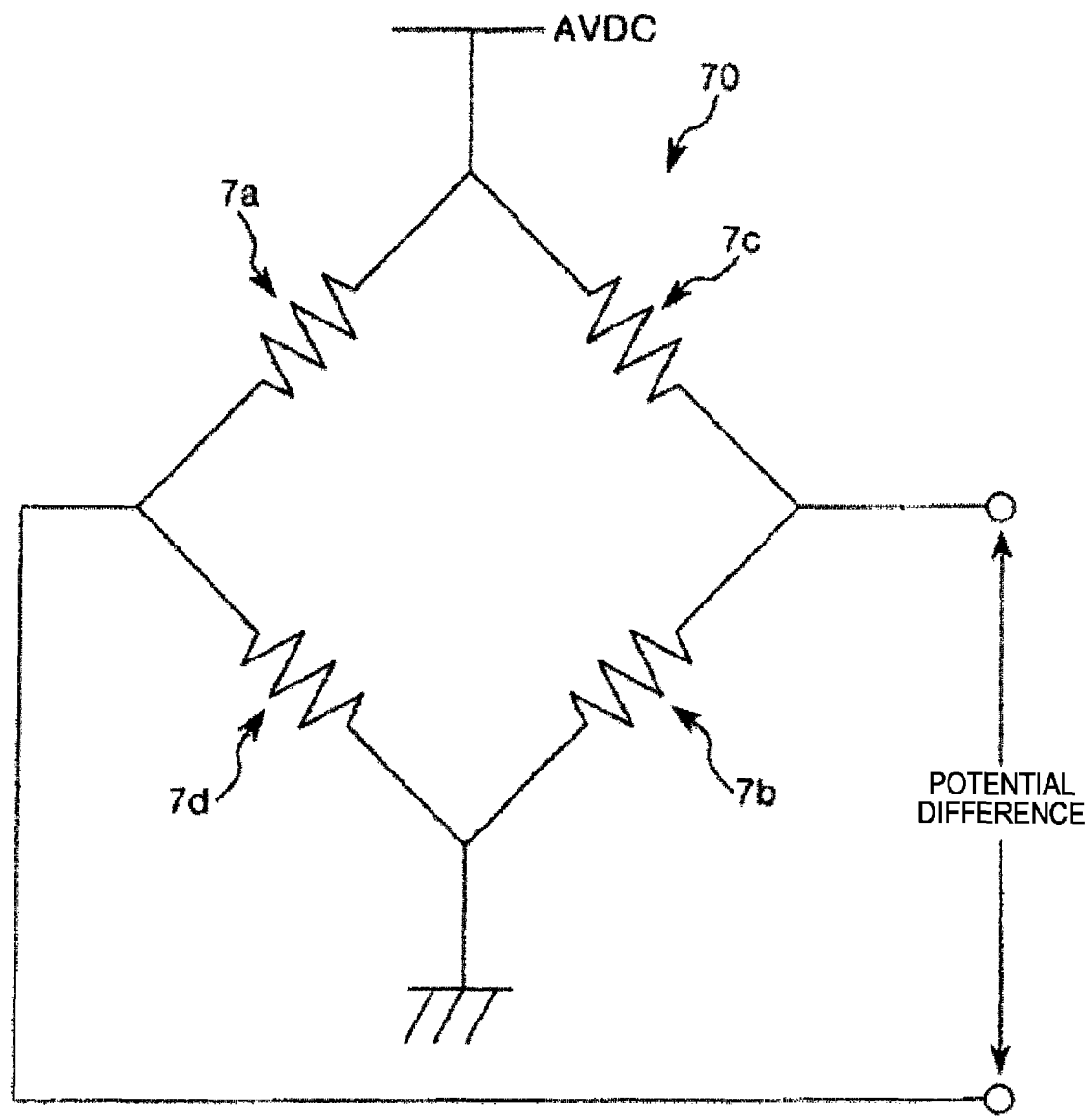
FIG. 3 is a diagram showing a bridge circuit including the sensor element (piezoresistive element) shown in FIG. 1.
Figure 4A:
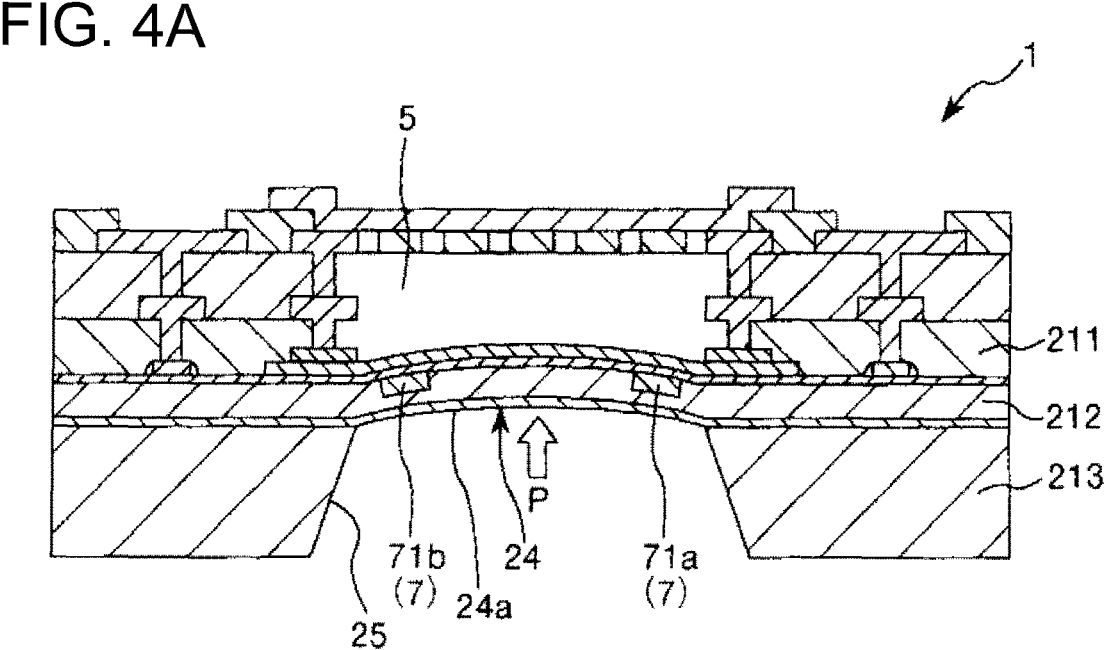
FIGS. 4A and 4B are diagrams illustrating actions of the physical quantity sensor shown in FIG. 1.
Figure 4B:
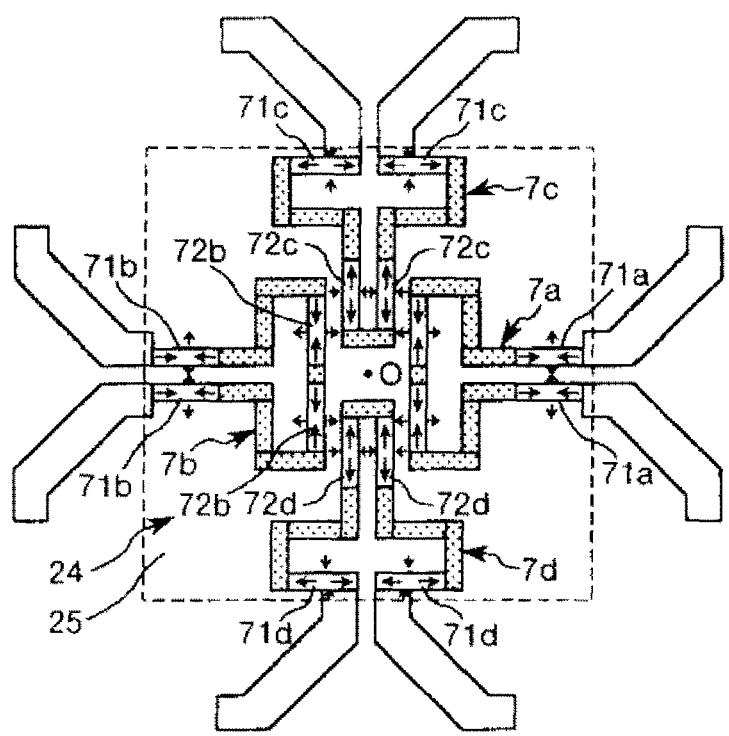
Figure 5:
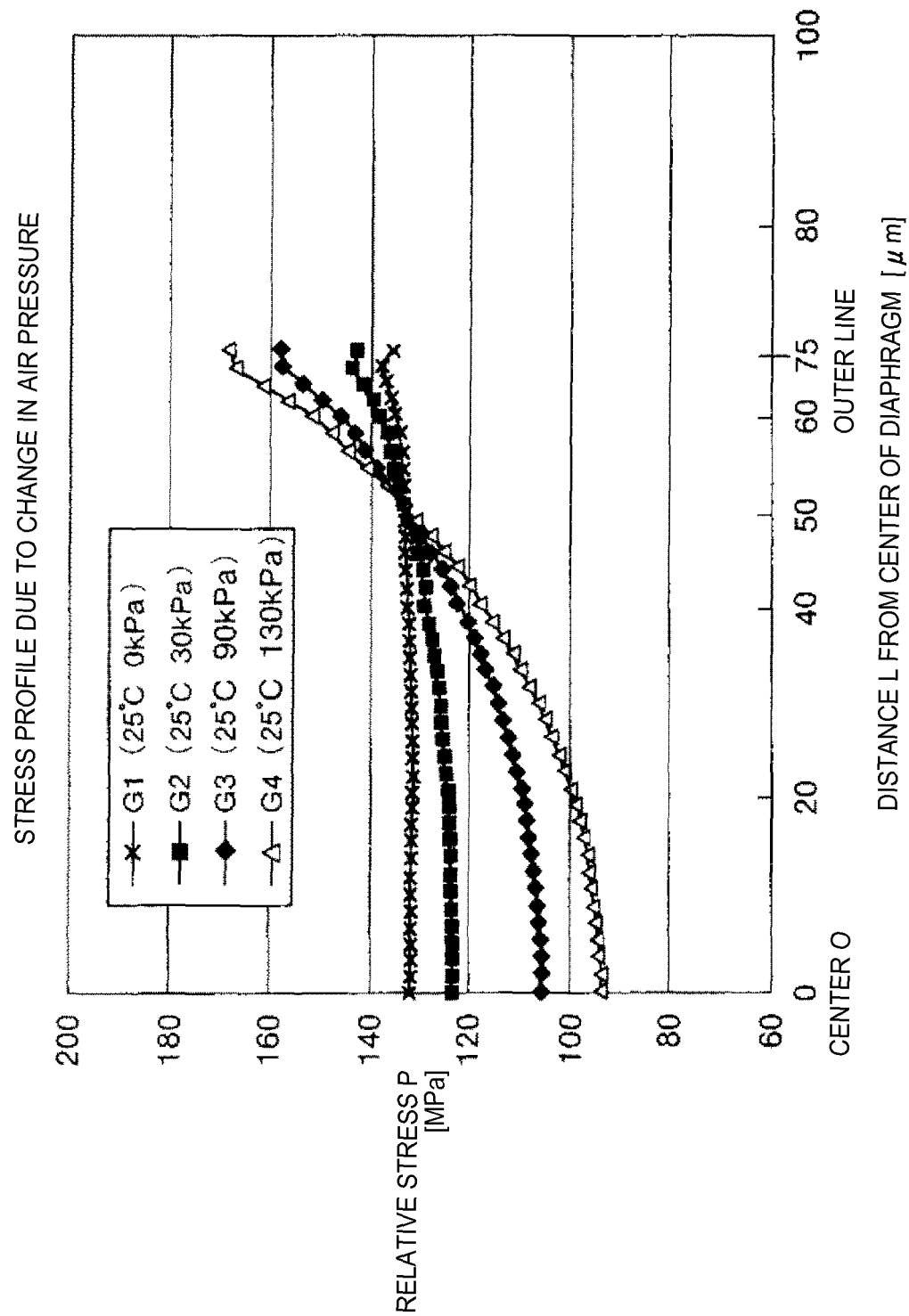
FIG. 5 is a graph showing the magnitude of stress (relative stress) which is generated in a diaphragm due to bending deformation.
Figure 6:
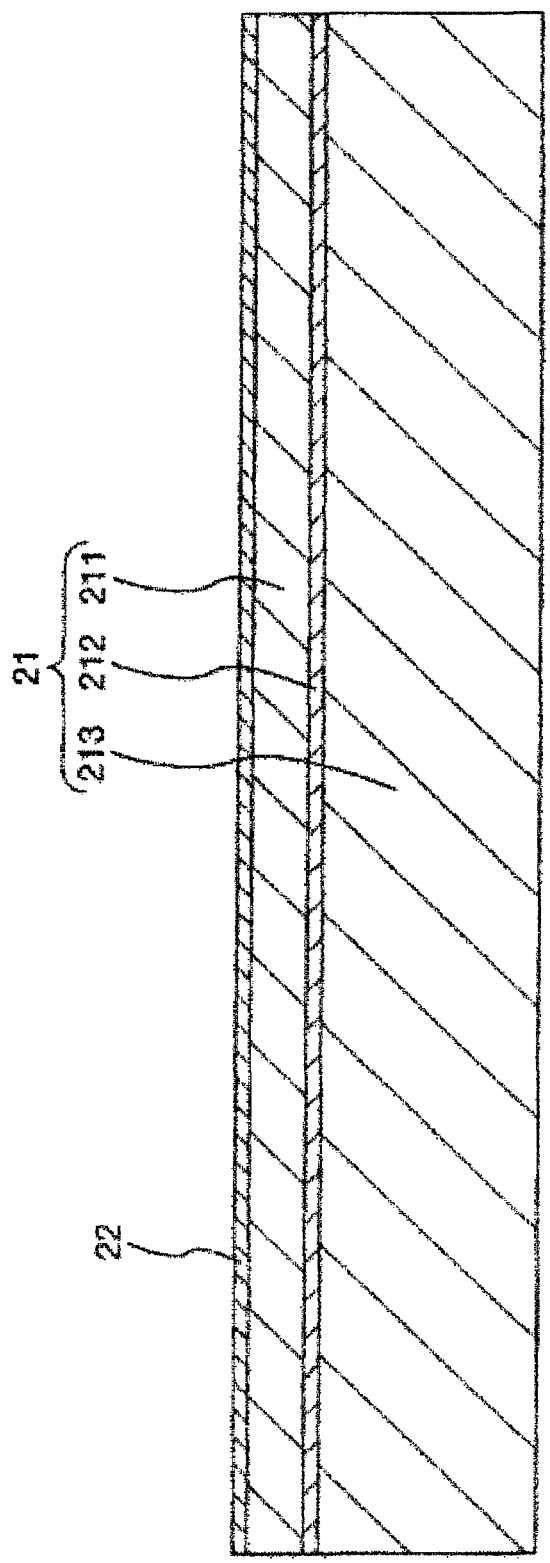
FIG. 6 is a diagram showing a process of manufacturing the pressure sensor shown in FIG. 1.
Figure 7:
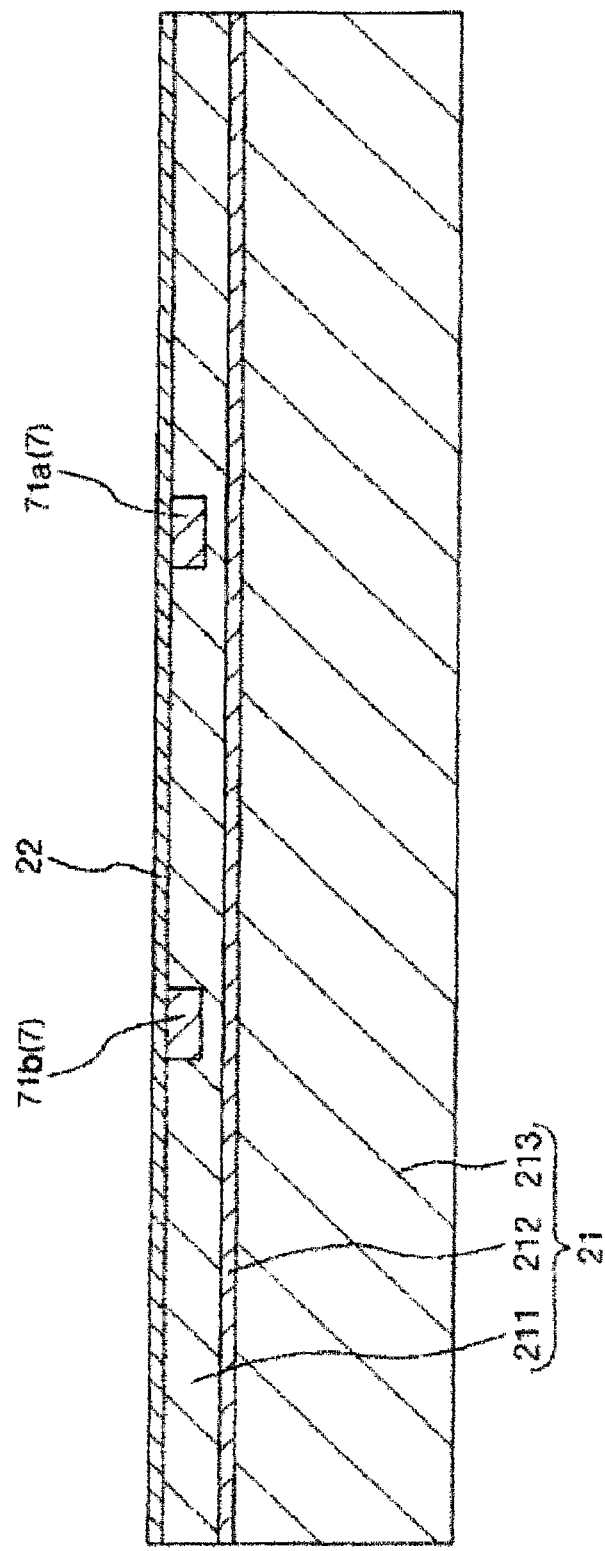
FIG. 7 is a diagram showing a process of manufacturing the pressure sensor shown in FIG. 1.

FIG. 1 is a cross-sectional view showing a physical quantity sensor according to a first embodiment of the invention. FIG. 2 is an enlarged plan view illustrating the arrangement of a sensor element (piezoresistive element) which is included in the physical quantity sensor shown in FIG. 1. FIG. 3 is a diagram showing a bridge circuit including the sensor element (piezoresistive element) shown in FIG. 1. FIGS. 4A and 4B are diagrams illustrating actions of the physical quantity sensor shown in FIG. 1. FIG. 4A is a cross-sectional view showing a pressurized state, and FIG. 4B is a plan view showing the pressurized state. FIG. 5 is a graph showing the magnitude of stress (relative stress) which is generated in a diaphragm due to bending deformation. FIG. 6 is a diagram showing a process of manufacturing the pressure sensor shown in FIG. 1. FIG. 7 is a diagram showing a process of manufacturing the pressure sensor shown in FIG. 1. FIGS. 8 to 13 are diagrams showing a process of manufacturing the pressure sensor shown in FIG. 1. Meanwhile, in the following description, an upper side in FIG. 1 is defined as "upper", and a lower side is defined as "lower".

A physical quantity sensor 1 is a pressure sensor which is capable of detecting pressure. The physical quantity sensor 1 serves as a sensor capable of being mounted on, for example, various electronic apparatuses for measuring altitude by being configured as a pressure sensor, and thus the convenience thereof is improved.

As shown in FIG. 1, the physical quantity sensor 1 includes a substrate 2, a sensor element 7, an element surrounding structure 4, a hollow portion 5, and a semiconductor circuit 9. Hereinafter, these portions will be sequentially described.

Substrate 2

The substrate 2 has a plate shape and is configured such that a first insulating film 22 constituted by a silicon oxide film ($SiO_2$ film) and a second insulating film 23 constituted by a silicon nitride film (SiN film) are laminated in this order on a semiconductor substrate 21 constituted by an SOI substrate (substrate on which a first Si layer 211, an $SiO_2$ layer 212, and a second Si layer 213 are laminated in this order). However, the semiconductor substrate 21 is not limited to the SOI substrate. For example, a silicon substrate may be used. In addition, materials of the first insulating film 22 and the second insulating film 23 are not particularly limited as long as the materials can protect the semiconductor substrate 21 and can insulate the semiconductor substrate 21 and the sensor element 7 from each other during the manufacture thereof. In addition, the plan-view shape of the substrate 2 is not particularly limited, and may be, for example, a quadrangular shape such as an approximately square shape or an approximately rectangular shape or may be a circular shape. In this embodiment, the plan-view shape of the substrate is an approximately square shape.

In addition, the substrate 2 is provided with a diaphragm 24 which is thinner than the surrounding portions and which is bent and deformed due to pressure reception. The diaphragm 24 is formed by providing a bottomed concave portion 25 in the lower surface (second Si layer 213) of the substrate 2, and the lower surface thereof (bottom of the concave portion 25) serves as a pressure receiving surface 24a. The plan-view shape of the diaphragm 24 is not particularly limited, and may be, for example, a quadrangular shape such as an approximately square shape or an approximately rectangular shape or may be a circular shape. In this embodiment, the plan-view shape of the substrate is an approximately square shape. In addition, the width of the diaphragm 24 is not particularly limited, and may be set to be approximately equal to or greater than 100 μm and equal to or less than 600 μm. In addition, the thickness of the diaphragm 24 is not particularly limited. For example, the thickness is preferably equal to or greater than 10 μm and equal to or less than 50 μm and is more preferably equal to or greater than 15 μm and equal to or less than 25 μm. Thereby, the diaphragm 24 can be made to be sufficiently flexible and sufficiently bent and deformed.

In addition, the semiconductor circuit (circuit) 9 is formed on and above the semiconductor substrate 21. The semiconductor circuit 9 includes active elements such as a MOS transistor 91 formed as necessary and circuit elements such as a capacitor, an inductor, a resistor, a diode, and a wiring. In this manner, the semiconductor circuit 9 is formed in the substrate 2, and thus it is possible to achieve a reduction in the size of the physical quantity sensor 1, as compared with a case where the semiconductor circuit 9 is provided as a separate body. Meanwhile, for convenience of description, only the MOS transistor 91 is shown in FIG. 1.

Sensor Element 7

As shown in FIGS. 1 and 2, the first Si layer 211 of the substrate 2 is provided with the sensor element 7 including a plurality of (four in this embodiment) piezoresistive elements (bending amount elements) 7a, 7b, 7c, and 7d.

Meanwhile, a detailed configuration of the sensor element 7 will be described later.

Element Surrounding Structure 4

The element surrounding structure 4 is formed so as to define the hollow portion 5. The element surrounding structure 4 includes an annular wall portion 51 formed on the substrate 2 so as to surround the sensor element 7 and a covering portion 52 which closes an opening of the hollow portion 5 surrounded by the inner wall of the wall portion 51.

The element surrounding structure 4 includes an interlayer insulating film 41, a wiring layer 42 formed on the interlayer insulating film 41, an interlayer insulating film 43 formed on the wiring layer 42 and the interlayer insulating film 41, a wiring layer 44 formed on the interlayer insulating film 43, a surface protection film 45 formed on the wiring layer 44 and the interlayer insulating film 43, and a sealing layer 46. The wiring layer 44 includes a coating layer 441 including a plurality of pores 442 for making the inside and outside of the hollow portion 5 communicate with each other, and the sealing layer 46 disposed on the coating layer 441 seals the pores 442. In the element surrounding structure 4, the wall portion 51 mentioned above is constituted by the interlayer insulating film 41, the wiring layer 42, the interlayer insulating film 43, the wiring layer 44 (here, a portion other than the coating layer 441) and surface protection film 45, and the covering portion 52 mentioned above is constituted by the coating layer 441 and the sealing layer 46.

Meanwhile, the wiring layers 42 and 44 include wiring layers 42a and 44a formed to surround the hollow portion 5 and wiring layers 42b and 44b constituting a wiring of the semiconductor circuit 9. Accordingly, the semiconductor circuit 9 is extracted to the upper surface of the physical quantity sensor 1 by the wiring layers 42b and 44b. In addition, a film 49 constituted by, for example, a polycrystalline silicon film is provided between the wiring layer 42a and the second insulating film 23.

The interlayer insulating films 41 and 43 are not particularly limited, and an insulating film such as, for example, a silicon oxide film ($SiO_2$ film) may be used. In addition, the wiring layers 42 and 44 are not particularly limited, and a metal film such as, for example, an aluminum film may be used. In addition, the sealing layer 46 is not particularly limited, and a metal film such as those of Al, Cu, W, Ti, or TiN may be used. In addition, the surface protection film 45 is not particularly limited, and a resistant film such as a silicon oxide film, a silicon nitride film, a polyimide film, and an epoxy resin film for protecting elements from moisture, dust, damage, or the like may be used.

Hollow Portion 5

The hollow portion 5 defined by the substrate 2 and the element surrounding structure 4 is a sealed space and functions as a reference pressure chamber used for a reference value for pressure which is detected by the physical quantity sensor 1. The hollow portion 5 is disposed so as to overlap the diaphragm 24, and the diaphragm 24 constitutes a portion of a wall portion defining the hollow portion 5. A state within the hollow portion 5 is not particularly limited, but is preferably a vacuum state (for example, equal to or less than 10 Pa). Thereby, it is possible to use the physical quantity sensor 1 as an "absolute pressure sensor" that detects pressure on the basis of the vacuum state. For this reason, the convenience of the physical quantity sensor 1 is improved. Here, a state within the hollow portion 5 is not a vacuum state, and may be, for example, an atmospheric pressure state, may be a depressurized state where the air pressure is lower than atmospheric pressure, and may be a pressurized state where the air pressure is higher than atmospheric pressure. In addition, an inert gas such as a nitrogen gas or a rare gas may be sealed in the hollow portion 5.

As stated above, the configuration of the physical quantity sensor 1 has been described briefly. However, the physical quantity sensor 1 of this embodiment has characteristics in the configuration of the sensor element 7 and the arrangement thereof, which will be described below in detail.

As described above, the sensor element 7 includes a plurality of (four in this embodiment) piezoresistive elements (bending amount elements) 7a, 7b, 7c, and 7d.

As shown in FIG. 2, the piezoresistive elements 7a and 7b are provided corresponding to a pair of sides 241a and 241b of the diaphragm 24 which face each other in a horizontal direction in FIG. 2 in a plan view seen from the thickness direction of the substrate 2. In addition, the piezoresistive elements 7c and 7d are provided corresponding to a pair of sides 241c and 241d of the diaphragm 24 which face each other in a vertical direction in FIG. 2 when seen in a plan view.

The piezoresistive element 7a includes a pair of edge portion side piezoresistive portions (edge portion side elements) 71a which are provided in the outer edge portion (more specifically, in the vicinity of the side 241a) of the diaphragm 24 and a pair of center side piezoresistive portions (center side elements) 72a which are provided closer to a center O side of the diaphragm 24 than the edge portion side piezoresistive portions 71a. The edge portion side piezoresistive portions 71a and the center side piezoresistive portions 72a are provided lined up toward the side 241a from the center O of the diaphragm 24.

The pair of edge portion side piezoresistive portions 71a are parallel to each other and have a rectangular shape (longitudinal shape) which extends in a direction perpendicular to the side 241a. On the other hand, the pair of center side piezoresistive portions 72a are disposed on the same straight line which is parallel to the side 241a and have a rectangular shape (longitudinal shape) which extends in a direction parallel to the side 241a. For this reason, the longitudinal direction of the edge portion side piezoresistive portion 71a and the longitudinal direction of the center side piezoresistive portion 72a are perpendicular to (intersect) each other.

In addition, one end (the center O side of the diaphragm 24) of the edge portion side piezoresistive portion 71a and one end of the center side piezoresistive portion 72a are connected to each other through a connection portion 73a.

The connection portion 73a has an approximately S shape and is connected to the edge portion side piezoresistive portion 71a. The connection portion is constituted by a portion extending along a direction perpendicular to the side 241a, a portion which is connected to the center side piezoresistive portion 72a and extends along a direction perpendicular to the side 241a, and a portion which connects the portions and extends along a direction parallel to the side 241a.

In addition, ends of the pair of center side piezoresistive portions 72a which are different from the ends connected to the connection portions 73a are connected to each other through a connection portion 74a. In addition, ends of the pair of edge portion side piezoresistive portions 71a which are different from the ends connected to the connection portions 73a are connected to wirings 31a, respectively.

As shown in FIG. 2, the piezoresistive element 7b is configured to be laterally symmetrical to the piezoresistive element 7a mentioned above through an axial line 313 passing through the center O of the diaphragm 24. In detail, similarly to the piezoresistive element 7a, the piezoresistive element 7b includes a pair of edge portion side piezoresistive portions (edge portion side elements) 71b provided in the outer edge portion (more specifically, in the vicinity of the side 241b) of the diaphragm 24 and a pair of center side piezoresistive portions (center side elements) 72b which are provided closer to the center O side of the diaphragm 24 than the edge portion side piezoresistive portions 71b. The edge portion side piezoresistive portions 71b and the center side piezoresistive portions 72b are provided lined up toward the side 241b from the center O of the diaphragm 24. In addition, the edge portion side piezoresistive portions 71b and the center side piezoresistive portions 72b have a rectangular shape (longitudinal shape), and the longitudinal direction of the edge portion side piezoresistive portion 71b and the longitudinal direction of the center side piezoresistive portion 72b are perpendicular to (intersect) each other.

In addition, similarly to the piezoresistive element 7a, the edge portion side piezoresistive portion 71b and the center side piezoresistive portion 72b are connected to each other through a connection portion 73b. In addition, similarly, the pair of center side piezoresistive portions 72b are connected to each other through a connection portion 74b. In addition, similarly, the pair of edge portion side piezoresistive portions 71b are connected to wirings 31b, respectively.

In addition, the piezoresistive element 7c includes a pair of edge portion side piezoresistive portions (edge portion side elements) 71c which are provided in the outer edge portion (more specifically, in the vicinity of the side 241c) of the diaphragm 24 and a pair of center side piezoresistive portions (center side elements) 72c which are provided closer to the center O side of the diaphragm 24 than the edge portion side piezoresistive portions 71c. The edge portion side piezoresistive portions 71c and the center side piezoresistive portions 72c are provided lined up toward the side 241c from the center O of the diaphragm 24.

The pair of edge portion side piezoresistive portions 71c are disposed on the same straight line which is parallel to the side 241c and have a rectangular shape (longitudinal shape) which extends along a direction parallel to the side 241c. On the other hand, the pair of center side piezoresistive portions 72c are parallel to each other and have a rectangular shape (longitudinal shape) which extends along a direction perpendicular to the side 241c. For this reason, the longitudinal direction of the edge portion side piezoresistive portion 71c and the longitudinal direction of the center side piezoresistive portion 72c are perpendicular to (intersect) each other.

In addition, one end of the edge portion side piezoresistive portion 71c and one end (the side 241c side) of the center side piezoresistive portion 72c are connected to each other through a connection portion 73d.

The connection portion 73d has an approximately S shape and is connected to the edge portion side piezoresistive portion 71c. The connection portion is constituted by a portion extending along a direction perpendicular to the side 241c, a portion which is connected to the center side piezoresistive portion 72c and extends along a direction perpendicular to the side 241c, and a portion which connects the portions and extends along a direction parallel to the side 241c.

In addition, ends of the pair of center side piezoresistive portions 72c which are different from the ends connected to the connection portions 73c are connected to each other through a connection portion 74c which is located closer to the center O side than the pair of center side piezoresistive portions 72c. In addition, the pair of edge portion side piezoresistive portions 71c are connected to wirings 31c, respectively, in side surfaces on the respective end sides of the pair of edge portion side piezoresistive portions which are different from the ends connected to the connection portions 73c.

As shown in FIG. 2, the piezoresistive element 7d is configured to be laterally symmetrical to the piezoresistive element 7c mentioned above through an axial line 314. In detail, similarly to the piezoresistive element 7c, the piezoresistive element 7d includes a pair of edge portion side piezoresistive portions (edge portion side elements) 71d which are provided in the outer edge portion (more specifically, in the vicinity of the side 241d) of the diaphragm 24 and a pair of center side piezoresistive portions (center side elements) 72d which are provided closer to the center O side of the diaphragm 24 than the edge portion side piezoresistive portions 71d. The edge portion side piezoresistive portions 71d and the center side piezoresistive portions 72d are provided lined up toward the side 241d from the center O of the diaphragm 24. In addition, the edge portion side piezoresistive portions 71d and the center side piezoresistive portions 72d have a rectangular shape (longitudinal shape), and the longitudinal direction of the edge portion side piezoresistive portion 71b and the longitudinal direction of the center side piezoresistive portion 72b are perpendicular to (intersect) each other.

In addition, similarly to the piezoresistive element 7c, the edge portion side piezoresistive portion 71d and the center side piezoresistive portion 72d are connected to each other through a connection portion 73d. In addition, similarly, the pair of center side piezoresistive portions 72b are connected to each other through a connection portion 74d. In addition, similarly, the pair of edge portion side piezoresistive portions 71d are connected to wirings 31d, respectively.

The edge portion side piezoresistive portions 71a, 71b, 71c, and 71d (hereinafter, simply referred to as "edge portion side piezoresistive portions 71") and the center side piezoresistive portions 72a, 72b, 72c, and 72d (hereinafter, simply referred to as "center side piezoresistive portions 72") are formed by doping the first Si layer 211 of the substrate 2 with impurities such as, for example, phosphorus and boron (by diffusing or implanting the impurities into the first Si layer). In addition, the connection portions 73a, 73b, 73c, 73d, 74a, 74b, 74c, and 74d and the wirings 31a, 31b, 31c, and 31d are formed by doping the first Si layer 211 with impurities such as phosphorus and boron (by diffusing or implanting the impurities into the first Si layer at a higher concentration than, for example, in the edge portion side piezoresistive portion 71 and the center side piezoresistive portion 72.

In addition, the piezoresistive elements 7a, 7b, 7c, and 7d are configured such that the resistance values thereof under natural conditions become equal to each other. In addition, the piezoresistive elements 7a, 7b, 7c, and 7d are distorted in association with the deformation of the diaphragm 24 and the resistance values thereof change in accordance with the distortion. The piezoresistive elements 7a, 7b, 7c, and 7d are electrically connected to each other through the wirings 31a, 31b, 31c, and 31d and the like, and constitute a bridge circuit 70 (Wheatstone bridge circuit), as shown in FIG. 3. A driving circuit (not shown) for supplying a driving voltage AVDC is connected to the bridge circuit 70. Then, the bridge circuit 70 outputs a signal (voltage) depending on the resistance values of the piezoresistive elements 7a, 7b, 7c, and 7d.

In addition, when division into four regions is made by two diagonal lines 311 and 312 (two straight lines intersecting each other at the center O of the diaphragm 24), the piezoresistive elements 7a, 7b, 7c, and 7d are provided so as to correspond to the respective divided regions. Meanwhile, hereinafter, the region positioned at the right side in FIG. 2 is referred to as a "first region 35a", and the subsequent regions sequentially positioned clockwise are referred to as a "fourth region 35d", a "second region 35b", and a "third region 35c".

Specifically, as shown in FIG. 2, most of the piezoresistive element 7a is provided within the first region 35a. In addition, most of the piezoresistive element 7b is provided within the second region 35b. In addition, most of the piezoresistive element 7c is provided within the third region 35c. In addition, most of the piezoresistive element 7d is provided within the fourth region 35d.

In this manner, one piezoresistive element is provided within each region, and thus it is possible to equally detect pressure applied to the pressure receiving surface 24a of the diaphragm 24 and to further increase the detection accuracy of the physical quantity sensor 1.

In particular, it is preferable that most (equal to and more than eighty percent of the planar area of each piezoresistive portion) of each of the edge portion side piezoresistive portion 71 and the center side piezoresistive portion 72 falls within each region (within one region), and it is more preferable that the entirety thereof falls within each region (within one region). Thereby, it is possible to particularly increase the amount of change in the resistance values of the piezoresistive elements 7a, 7b, 7c, and 7d by the pressure applied to the pressure receiving surface 24a and to further improve the detection sensitivity of the physical quantity sensor 1.

In addition, when a distance from the center O of the diaphragm 24 to the outer edge is set to L, the center side piezoresistive portion 72 (particularly, the center of the center side piezoresistive portion 72) is preferably located within a range of equal to or less than 2L/3 from the center O and is more preferably located within a range of equal to or less than L/2 from the center O. The region within this range is a region where stress generated in the diaphragm 24 becomes smaller when the diaphragm 24 is deformed by pressure reception and is a region where the amount of change in the resistance value of the center side piezoresistive portion 72 particularly becomes larger due to pressure being applied to the diaphragm 24. Therefore, it is possible to further improve the detection sensitivity of the physical quantity sensor 1 by providing the center side piezoresistive portion 72 within this range.

In addition, it is preferable that the center side piezoresistive portion 72 (particularly, the center of the center side piezoresistive portion 72) is provided within a range of equal to or greater than L/4 from the center O. The region being within this range can result in an increase in the density of the center side piezoresistive portion 72. Therefore, it is possible to further improve the detection sensitivity of the physical quantity sensor 1 by providing the center side piezoresistive portion 72 within this range.

On the other hand, it is preferable that the edge portion side piezoresistive portion 71 (particularly, the center of the center side piezoresistive portion 72) is located within a range of equal to or greater than 2L/3 and equal to or less than L from the center O. The region within this range is a region where stress generated in the diaphragm 24 becomes larger when the diaphragm 24 is deformed by pressure reception and is a region where the amount of change in the resistance value of the edge portion side piezoresistive portion 71 particularly becomes larger due to pressure being applied to the pressure receiving surface 24a. Therefore, it is possible to further improve the detection sensitivity of the physical quantity sensor 1 by providing the edge portion side piezoresistive portion 71 within this range.

Hereinafter, effects obtained by disposing the edge portion side piezoresistive portion 71 and the center side piezoresistive portion 72 at locations satisfying the above-mentioned relationship will be described on the basis of a result of a simulation conducted by the inventors.

FIG. 5 shows a simulation result and is a graph showing the magnitude of stress (relative stress P) which is generated in a diaphragm due to bending deformation.

In addition, a horizontal axis of the graph shown in FIG. 5 represents the distance L, and a vertical axis represents the relative stress P [MPa]. Meanwhile, 0 μm on the horizontal axis represents the center O of the diaphragm 24, and 75 μm represents an end (outer edge) of the diaphragm 24.

In addition, a curve G1 represents relative stress when pressure of 0 kPa is applied to the pressure receiving surface 24$a$. In addition, a curve G2 represents relative stress when pressure of 30 kPa is applied to the pressure receiving surface 24$a$. A curve G3 represents relative stress when pressure of 90 kPa is applied to the pressure receiving surface 24$a$. In addition, a curve G4 represents relative stress when pressure of 130 kPa is applied to the pressure receiving surface 24$a$.

In addition, the graph shown in FIG. 5 shows a simulation result when the physical quantity sensor 1 including the square diaphragm 24 having a width of 150 μm (a distance from the center O to the end is 75 μm) is used. However, it is confirmed that the trend of the graph shown in FIG. 5 is similar even when the width of the diaphragm 24 is changed. This simulation shows a simulation result in a case where the physical quantity sensor 1 in which stress (initial stress) applied to the pressure receiving surface 24$a$ in an initial state (state before a predetermined stress is applied to the pressure receiving surface 24$a$) is 130 [MPa] is used. However, it is confirmed that a trend which is the same as the trend of the graph shown in FIG. 5 is obtained even when the initial stress is changed.

From the curves G2, G3, and G4 shown in FIG. 5, it can be understood that stress generated in the diaphragm 24 tends to become smaller with the distance L of equal to or greater than 0 μm and less than 50 μm and tends to become larger with the distance L of greater than 50 μm and equal to or less than 75 μm with the distance L of 50 μm as a boundary as the pressure received in the diaphragm 24 becomes larger. In this manner, a boundary (distance L is 50 μm) at which increasing and decreasing directions of generated stress are reversed is present depending on the magnitude of the pressure applied to the diaphragm 24. For this reason, it is preferable that the center side piezoresistive portion 72 is provided closer to the center O side than the boundary, that is, within a range of equal to or less than 2L/3 from the center O. In addition, it is preferable that the edge portion side piezoresistive portion 71 is provided closer to the edge portion side than the boundary, that is, within a range of equal to or greater than 2L/3 from the center O. Thereby, it is possible to particularly increase the amount of change in the resistance values of the piezoresistive elements 7$a$, 7$b$, 7$c$, and 7$d$ and to further improve the detection sensitivity of the physical quantity sensor 1.

In addition, as described above, the resistance values of the piezoresistive elements 7$a$, 7$b$, 7$c$, and 7$d$ change in accordance with the deformation of the diaphragm 24, which will be described below in detail.

As described above, since the resistance values of the piezoresistive elements 7$a$, 7$b$, 7$c$, and 7$d$ are equal to each other under natural conditions before the deformation of the diaphragm 24 occurs, the product of the resistance values of the piezoresistive elements 7$a$ and 7$b$ becomes equal to the product of the resistance values of the piezoresistive elements 7$c$ and 7$d$. For this reason, an output (potential difference) of the bridge circuit 70 is set to be zero.

On the other hand, when the diaphragm 24 is bent and deformed, the resistance values of the piezoresistive elements 7$a$, 7$b$, 7$c$, and 7$d$ change. Accordingly, a difference occurs between the product of the resistance values of the piezoresistive elements 7$a$ and 7$b$ and the product of the resistance values of the piezoresistive elements 7$c$ and 7$d$. For this reason, an output (potential difference) occurs from the bridge circuit 70.

Specifically, as described above, when the diaphragm 24 is bent and deformed as shown in FIG. 4A, stress generated in the diaphragm 24 becomes smaller on the center O side and becomes larger on the edge portion side.

Consequently, as shown in FIG. 4B, compressive stress along the longitudinal directions of the edge portion side piezoresistive portions 71$a$ and 71$b$ becomes larger, and compressive stress along the width directions of the center side piezoresistive portions 72$a$ and 72$b$ becomes smaller. In addition, compressive stress along the width directions of the edge portion side piezoresistive portions 71$c$ and 71$d$ becomes larger, and compressive stress along the longitudinal directions of the center side piezoresistive portions 72$c$ and 72$d$ becomes smaller.

The resistance values of the piezoresistive elements 7$a$ and 7$b$ are decreased and the resistance values of the piezoresistive elements 7$c$ and 7$d$ are increased due to the changes in the stress of the edge portion side piezoresistive portion 71 and the center side piezoresistive portion 72. For this reason, a difference occurs between the product of the resistance values of the piezoresistive elements 7$a$ and 7$b$ and the product of the resistance values of the piezoresistive elements 7$c$ and 7$d$, and an output (potential difference) depending on the difference is output from the bridge circuit 70. It is possible to obtain the magnitude of pressure applied to the pressure receiving surface 24$a$ on the basis of the output from the bridge circuit 70.

Particularly, in this embodiment, the edge portion side piezoresistive portion 71 and the center side piezoresistive portion 72 are provided. Since the longitudinal directions of the piezoresistive portions intersect each other, it is possible to further increase the difference between the product of the resistance values of the piezoresistive elements 7$a$ and 7$b$ and the product of the resistance values of the piezoresistive elements 7$c$ and 7$d$. Therefore, it is possible to further increase an output from the bridge circuit 70 and to particularly increase the detection sensitivity of pressure.

The sensor element 7 having the above-described configuration does not have a problem that a Q value is decreased due to vibration leakage to the diaphragm 24 as in a case where a vibration element such as a resonator is used as a sensor element even when the diaphragm 24 which is extremely thin is used. In addition, the piezoresistive elements 7$a$, 7$b$, 7$c$, and 7$d$ are configured by doping the first Si layer 211 with impurities such as phosphorus or boron, and thus it is possible to achieve a reduction in the height (thickness) of the physical quantity sensor 1, for example, as compared with a case where the piezoresistive elements 7$a$, 7$b$, 7$c$, and 7$d$ are provided so as to overlap the upper surface of the diaphragm 24.

In addition, since the hollow portion 5 and the semiconductor circuit 9 are provided on the same surface side of the semiconductor substrate 21 in the physical quantity sensor 1 mentioned above, the element surrounding structure 4 forming the hollow portion 5 does not protrude from the opposite side to the semiconductor circuit 9 of the semiconductor substrate 21, and thus it is possible to achieve a reduction in height of the physical quantity sensor. Then, the element surrounding structure 4 is formed by the same film formation as that of at least one of the interlayer insulating films 41 and 43 and the wiring layers 42 and 44. Thereby, it is possible to collectively form the element surrounding structure 4 and the semiconductor circuit 9 by using a CMOS process (particularly, a process of forming the interlayer insulating films 41 and 43 and the wiring layers 42 and 44). For this reason, a process of manufacturing the physical quantity sensor 1 is simplified. As a result, it is possible to achieve a reduction in the cost of the physical quantity sensor 1. In addition, even when the hollow portion 5 is sealed as in this embodiment, the hollow portion 5 can be sealed using a film formation method, and it is not necessary to seal a cavity by bonding a substrate of the related art. In this regard, a process of manufacturing the physical quantity sensor 1 is simplified. As a result, it is possible to achieve a reduction in the cost of the physical quantity sensor 1.

In addition, as described above, the sensor element 7 includes the piezoresistive elements 7a, 7b, 7c, and 7d, and the sensor element 7 and the semiconductor circuit 9 are provided on the same surface side of the semiconductor substrate 21, and thus it is possible to collectively form the sensor element 7 and the semiconductor circuit 9 using a CMOS process. Therefore, in this regard, it is possible to further simplify a process of manufacturing the physical quantity sensor 1.

In addition, since the sensor element 7 is disposed on the element surrounding structure 4 side of the diaphragm 24, it is possible to accommodate the sensor element 7 in the hollow portion 5. Therefore, it is possible to prevent the sensor element 7 from deteriorating or to reduce the deterioration in characteristics of the sensor element 7.

Next, a method of manufacturing the physical quantity sensor 1 will be briefly described.

FIGS. 6 to 13 are diagrams showing a process of manufacturing the physical quantity sensor 1 shown in FIG. 1. Hereinafter, a description will be given on the basis of these drawings.

Process of Forming Sensor Element

First, as shown in FIG. 6, the first insulating film (silicon oxide film) 22 is formed by providing the semiconductor substrate 21 constituted by an SOI substrate (substrate on which the first Si layer 211, the SiO$_2$ layer 212, and the second Si layer 213 are laminated in this order) and thermally oxidizing the surface of the semiconductor substrate.

Next, as shown in FIG. 7, the sensor element 7 and source and drain electrodes of the MOS transistor 91 are formed by doping the first Si layer 211 with impurities such as phosphorus or boron (by implanting ions into the first Si layer) through a mask not shown in the drawings. Meanwhile, since the first insulating film 22 is formed to be thin, the first Si layer 211 is doped with the impurities having passed through the first insulating film 22. In the ion implantation, ion implantation conditions and the like are adjusted so that the amount of impurities with which the edge portion side piezoresistive portion 71 and the center side piezoresistive portion 72 are doped exceeds that of the connection portions 73a, 73b, 73c, 73d, 74a, 74b, 74c, and 74d and the wirings 31a, 31b, 31c, and 31d.

Figure 8:
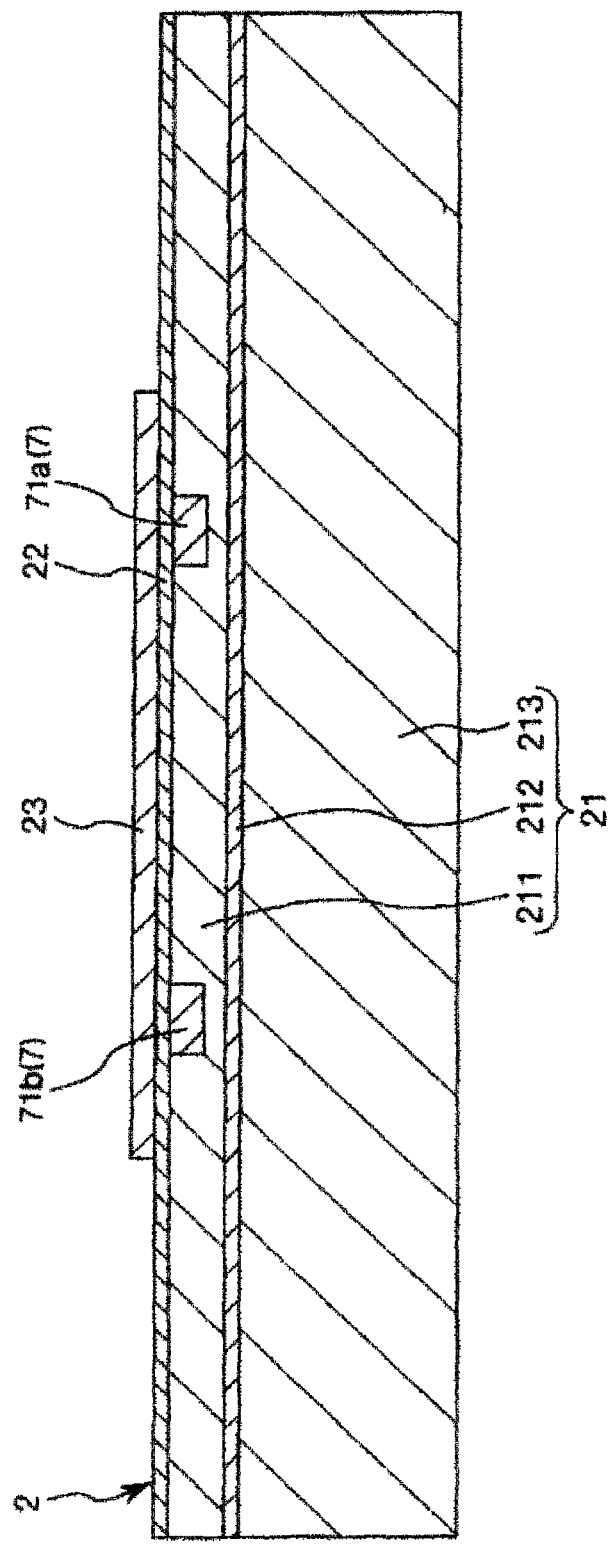
FIG. 8 is a diagram showing a process of manufacturing the pressure sensor shown in FIG. 1.

Next, as shown in FIG. 8, the second insulating film (silicon nitride film) 23 is formed on the first insulating film 22 using a sputtering method, a CVD method, or the like.

Figure 9:
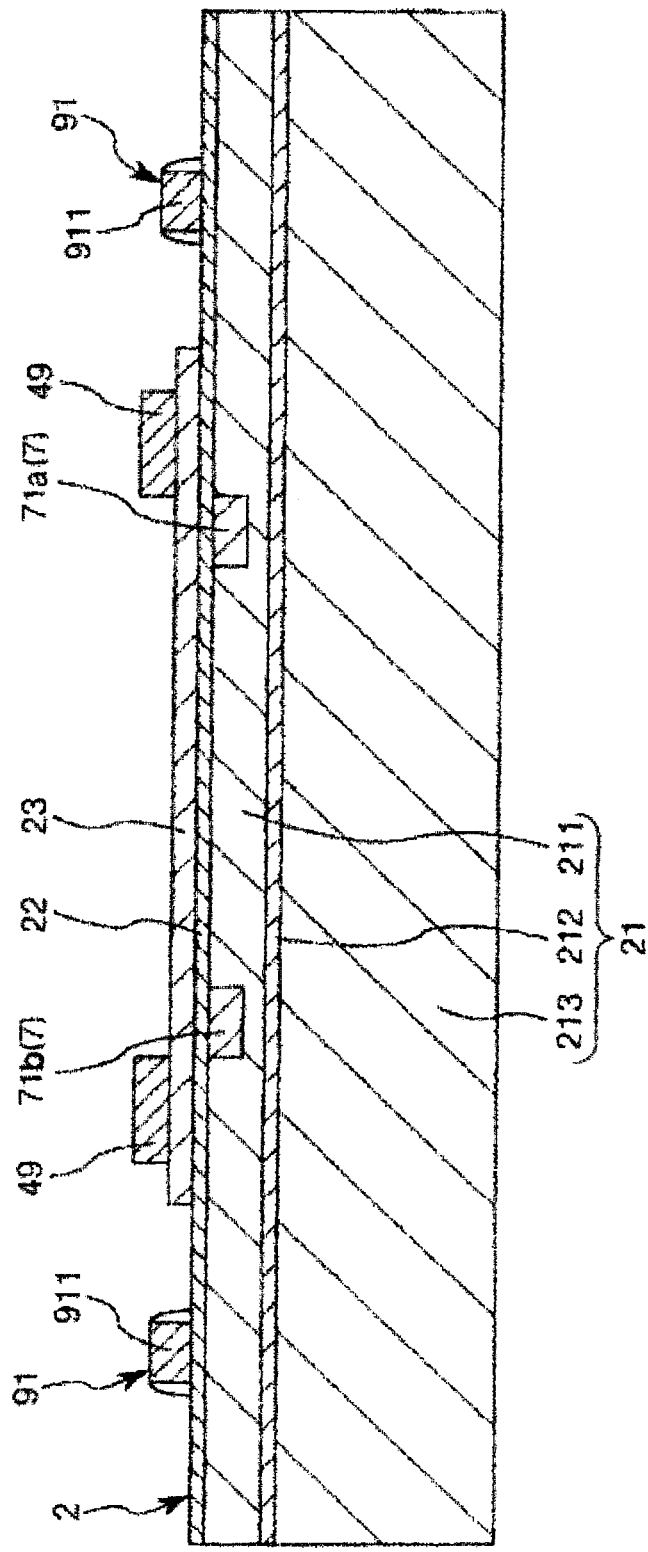
FIG. 9 is a diagram showing a process of manufacturing the pressure sensor shown in FIG. 1.

The second insulating film 23 has a resistance to etching performed in a process of forming a hollow portion to be performed later and functions as a so-called etching stop layer. Next, as shown in FIG. 9, a gate electrode 911 of the MOS transistor 91 and the film 49 are formed by forming a polycrystalline silicon film (or amorphous silicon film) in the upper surface of the substrate 2 using a sputtering method, a CVD method, or the like, and patterning the polycrystalline silicon film through etching.

Process of Forming Interlayer Insulating Film and Wiring Layer

Figure 10:
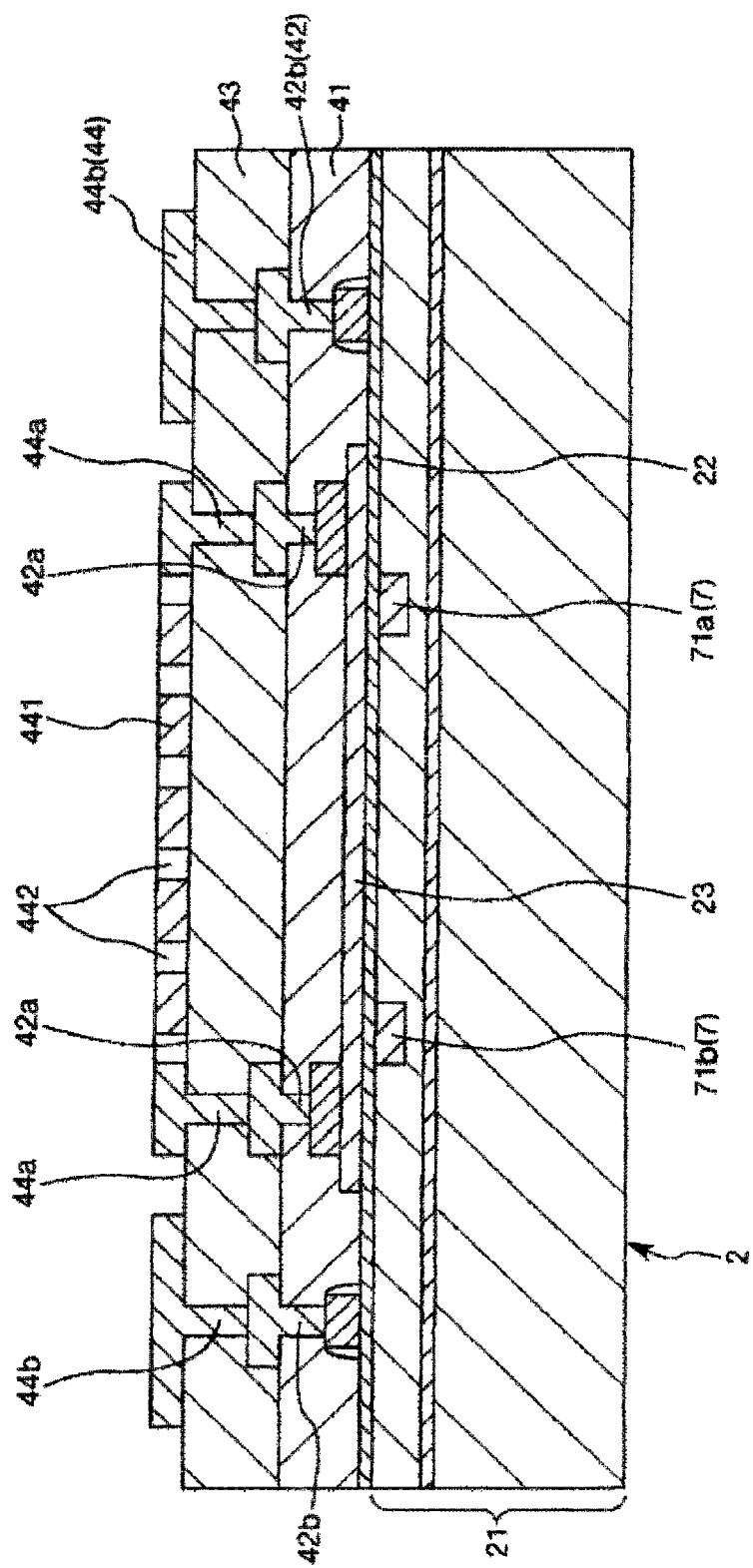
FIG. 10 is a diagram showing a process of manufacturing the pressure sensor shown in FIG. 1.

As shown in FIG. 10, the interlayer insulating films 41 and 43 and the wiring layers 42 and 44 are formed in the upper surface of the substrate 2. Thus, the sensor element 7, the MOS transistor 91, and the like are covered with the interlayer insulating films 41 and 43 and the wiring layers 42 and 44. The interlayer insulating films 41 and 43 are formed by forming a silicon oxide film using a sputtering method, a CVD method, or the like and patterning the silicon oxide film through etching. The thickness of each of the interlayer insulating films 41 and 43 is not particularly limited, and is set to be, for example, approximately equal to or greater than 1,500 nm and equal to or less than 5,000 nm. In addition, the wiring layers 42 and 44 are formed by forming a layer formed of, for example, aluminum on the interlayer insulating films 41 and 43 using a sputtering method, a CVD method, or the like and then performing patterning thereon. Here, the thickness of each of the wiring layers 42 and 44 is not particularly limited, and is set to be, for example, approximately equal to or greater than 300 nm and equal to or less than 900 nm.

In addition, the wiring layers 42a and 44a have an annular shape surrounding the sensor element 7 when seen in a plan view. In addition, the wiring layers 42b and 44b are electrically connected to a wiring (for example, a wiring constituting a portion of the semiconductor circuit 9) which is formed on and above the semiconductor substrate 21.

A laminated structure of the interlayer insulating films 41 and 43 and the wiring layers 42 and 44 is formed by a general CMOS process, and the number of laminated layers is set appropriately as necessary. That is, much more wiring layers may be laminated, as necessary, with an interlayer insulating film interposed therebetween.

Process of Forming Hollow Portion

Figure 11:
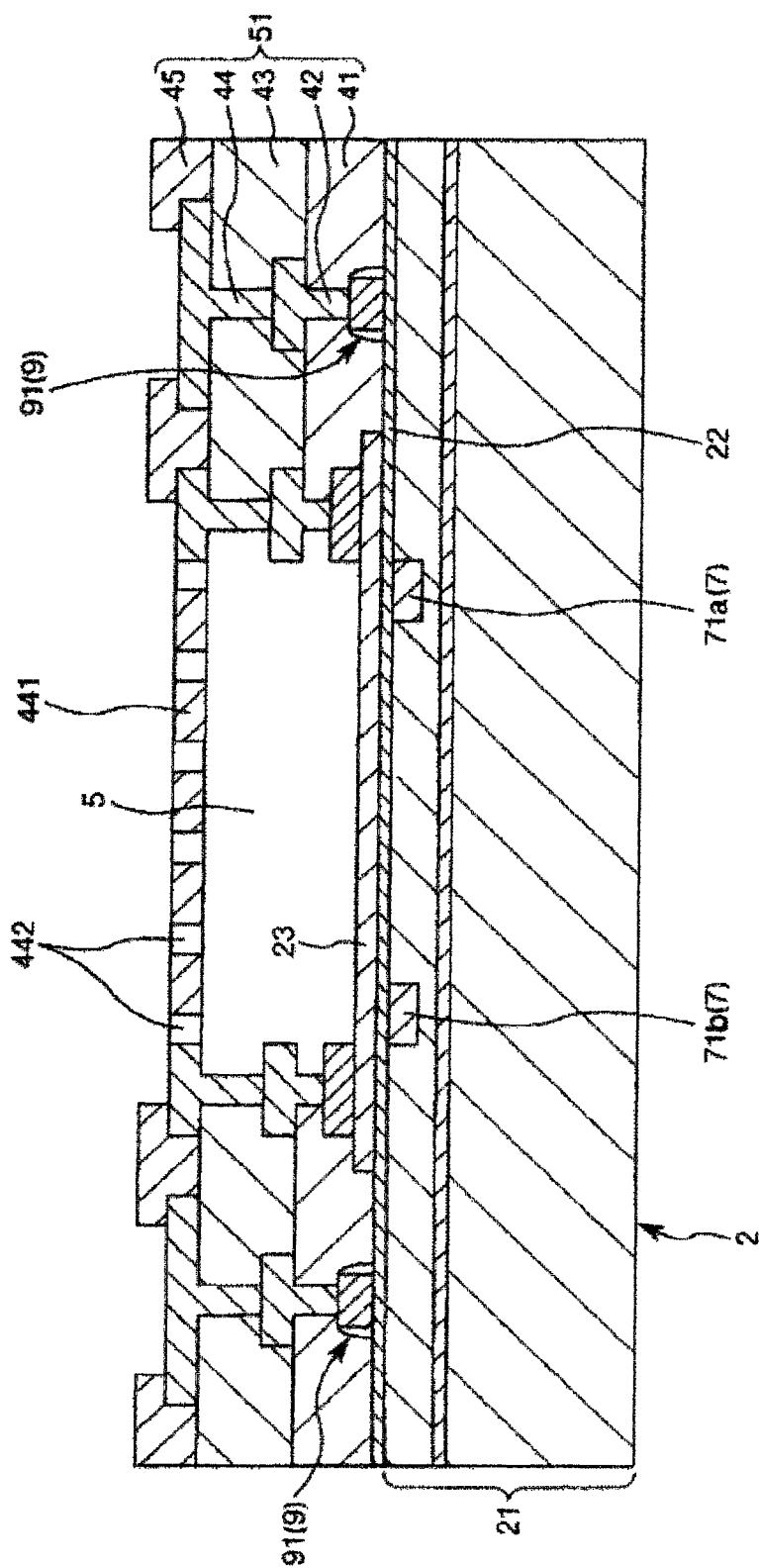
FIG. 11 is a diagram showing a process of manufacturing the pressure sensor shown in FIG. 1.

As shown in FIG. 11, the surface protection film 45 is formed using a sputtering method, a CVD method, or the like, and then the hollow portion 5 is formed through etching. The surface protection film 45 is constituted by a plurality of films including one or more types of materials, and is formed so as not to seal the pores 442 of the coating layer 441. Meanwhile, the surface protection film 45 is formed of a resistant film such as a silicon oxide film, a silicon nitride film, a polyimide film, and an epoxy resin film for protecting elements from moisture, dust, damage, or the like. The thickness of the surface protection film 45 is not particularly limited, and is set to be, for example, approximately equal to or greater than 500 nm and equal to or less than 2,000 nm.

In addition, the hollow portion 5 is formed by removing a portion of the interlayer insulating films 41 and 43 by etching through the plurality of pores 442 formed in the coating layer 441. Here, an etchant such as hydrofluoric acid or buffered hydrofluoric acid is supplied from the plurality of pores 442 when wet etching is used as such etching, and an etching gas such as a hydrofluoric acid gas is supplied from the plurality of pores 442 when dry etching is used as such etching.

Sealing Process

Figure 12:
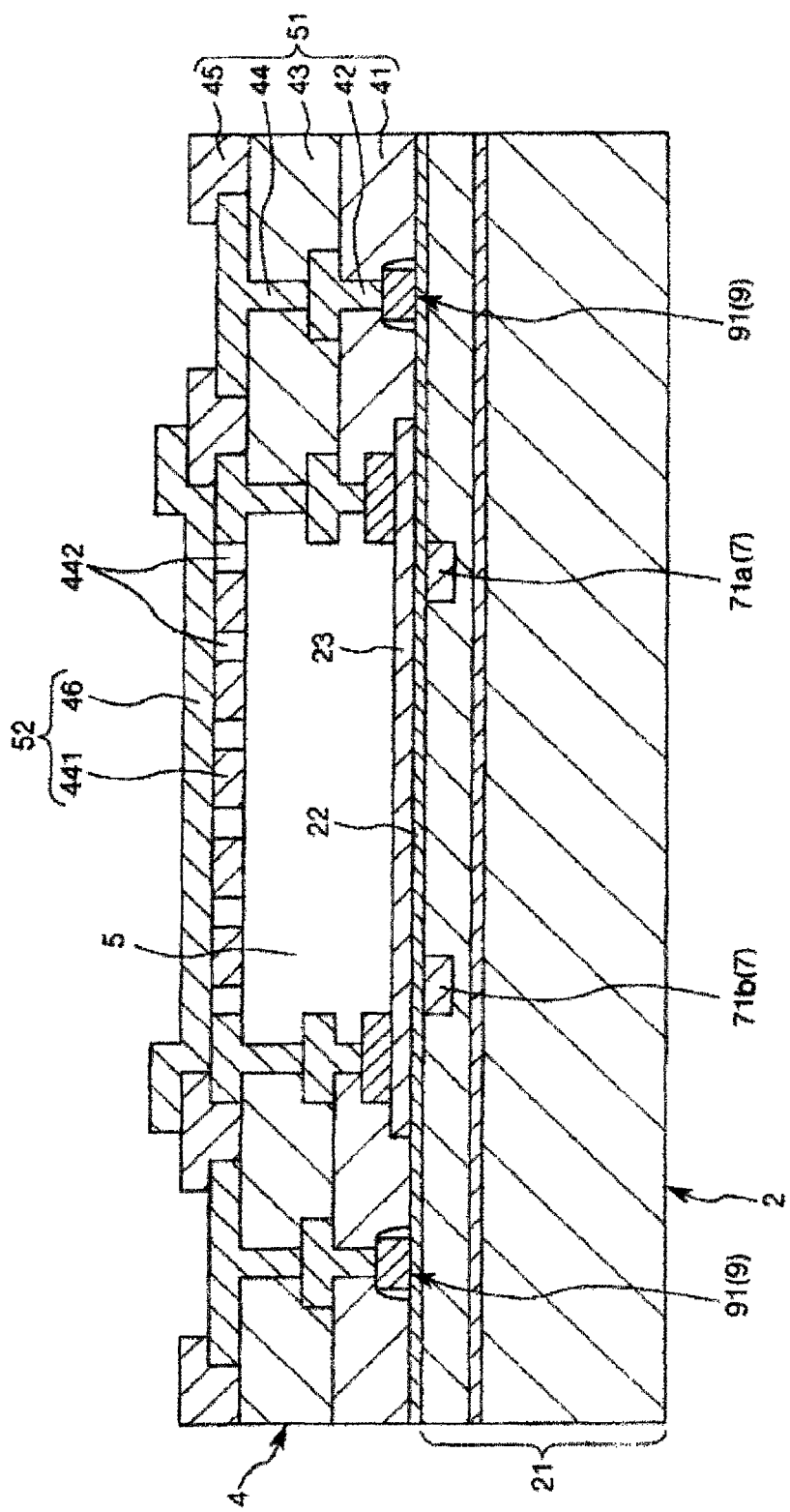
FIG. 12 is a diagram showing a process of manufacturing the pressure sensor shown in FIG. 1.

Next, as shown in FIG. 12, the sealing layer 46 formed of a metal film such as AL, Cu, W, Ti, or TiN is formed on the coating layer 441 using a sputtering method, a CVD method, or the like, and each of the pores 442 is sealed. Thereby, the hollow portion 5 is sealed by the sealing layer 46, and the covering portion 52 is formed. The thickness of the sealing layer 46 is not particularly limited, and is set to be, for example, approximately equal to or greater than 1,000 nm and equal to or less than 5,000 nm.

Process of Forming Diaphragm

Figure 13:
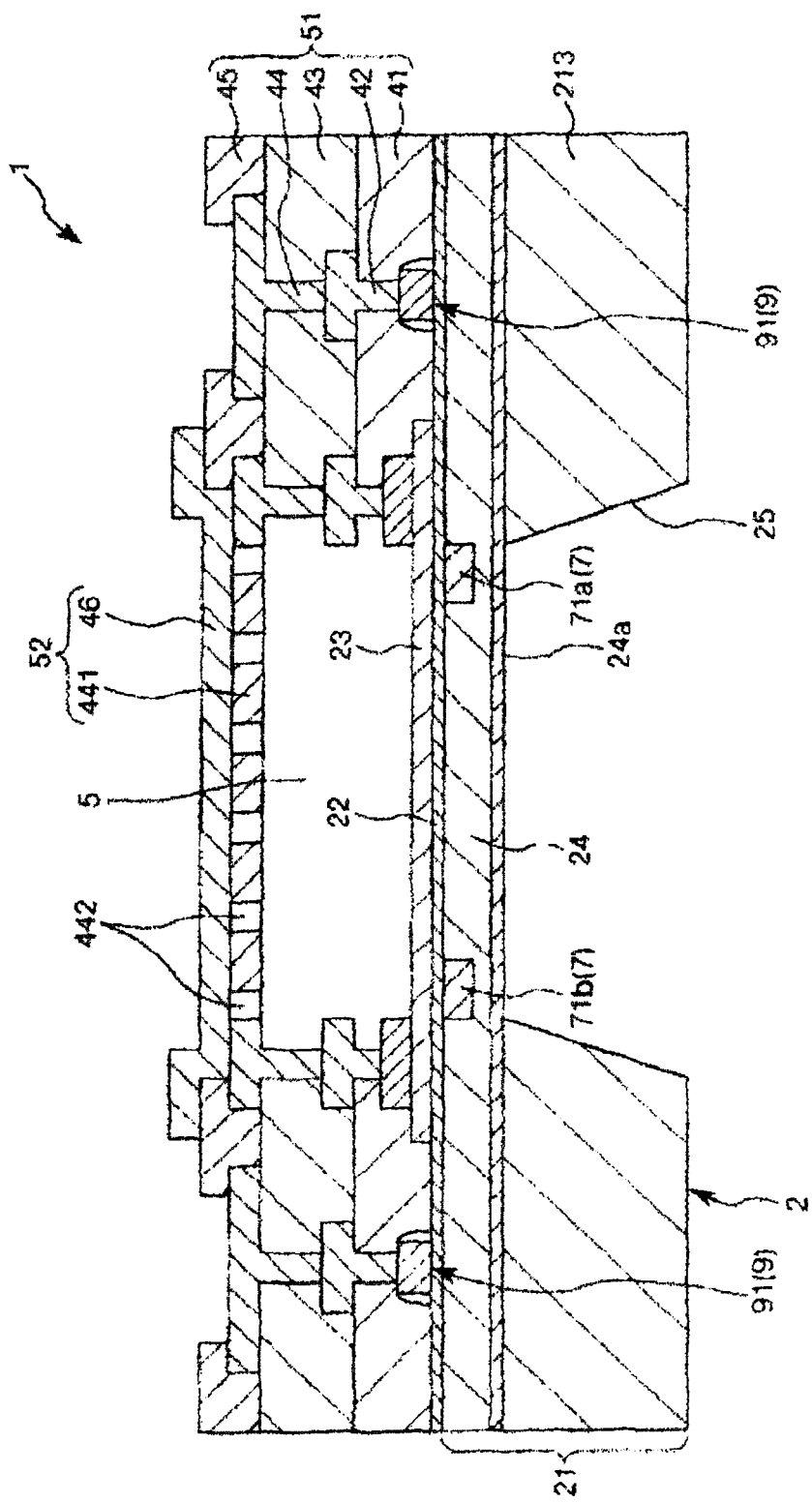
FIG. 13 is a diagram showing a process of manufacturing the pressure sensor shown in FIG. 1.

Finally, as shown in FIG. 13, a portion of the lower surface (second Si layer 213) of the semiconductor substrate 21 is removed by wet etching. At this time, the $SiO_2$ layer 212 functions as an etching stop layer. Thereby, the physical quantity sensor 1 having the diaphragm 24, which is thinner-walled than the surroundings, being formed therein is obtained. Meanwhile, a method of removing a portion of the lower surface of the semiconductor substrate 21 is not limited to wet etching, and may be dry etching or the like.

It is possible to manufacture the physical quantity sensor 1 through such processes. Meanwhile, active elements other than the MOS transistor included in the semiconductor circuit and circuit elements such as a capacitor, an inductor, a resistor, a diode, and a wiring can be formed during the appropriate above-mentioned processes (for example, the processes of forming the vibration element, the insulating film, the coating layer, and the sealing layer).

Second Embodiment

Next, a physical quantity sensor according to a second embodiment of the invention will be described.

Figure 14:
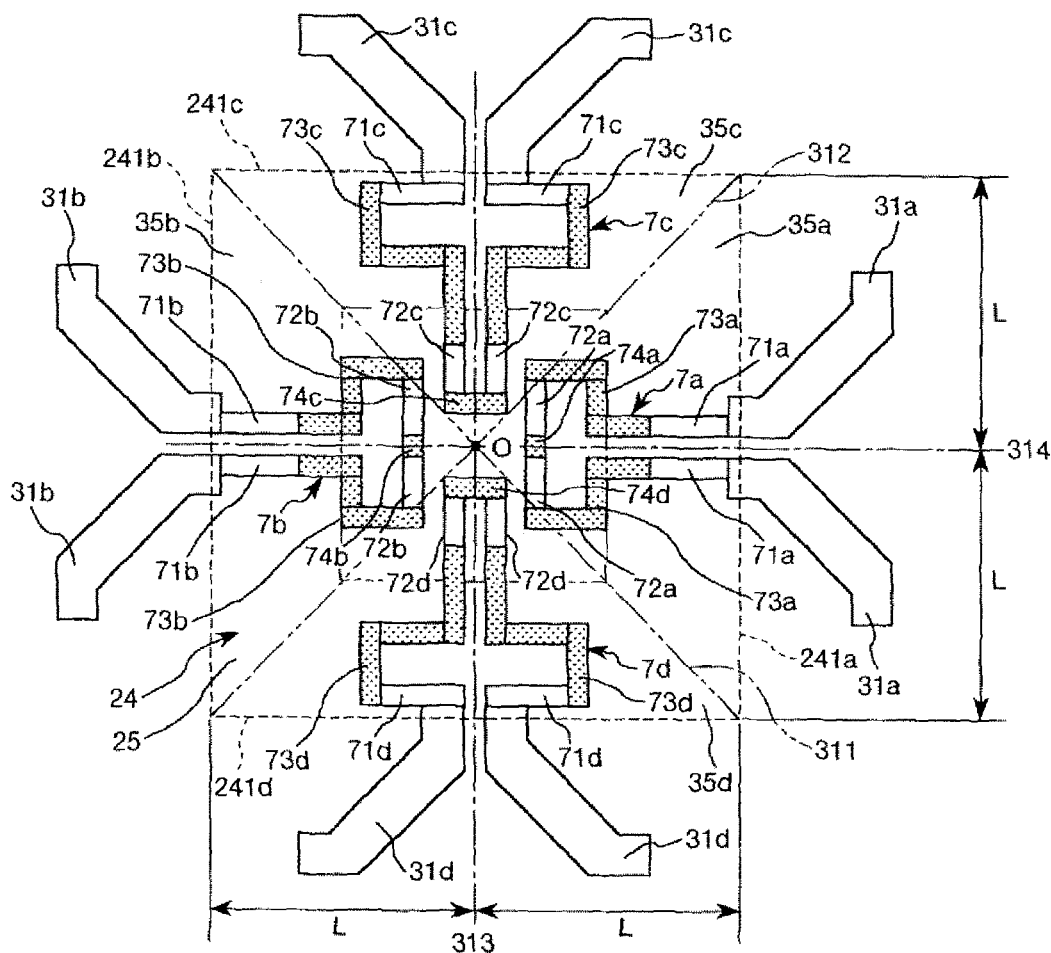
FIG. 14 is a cross-sectional view showing a physical quantity sensor according to a second embodiment of the invention.

FIG. 14 is a cross-sectional view of the physical quantity sensor according to the second embodiment of the invention.

Hereinafter, the physical quantity sensor according to the second embodiment of the invention will be described, but a description will be given with focus on differences from the above-mentioned embodiment, and common particulars will not be described below.

The second embodiment is the same as the first embodiment, except that the configuration of a sensor element 7 is different from the above one.

Specifically, in the sensor element 7 included in a physical quantity sensor 1 shown in FIG. 14, the lengths of center side piezoresistive portions 72a, 72b, 72c, and 72d in the longitudinal direction are shorter than the respective lengths of the center side piezoresistive portions 72a, 72b, 72c, and 72d of the first embodiment. For this reason, in this embodiment, the lengths of the center side piezoresistive portions 72a, 72b, 72c, and 72d in the longitudinal direction are shorter than the lengths of edge portion side piezoresistive portions 71a, 71b, 71c, and 71d in the longitudinal direction. Therefore, it is possible to more reliably make the center side piezoresistive portions 72a, 72b, 72c, and 72d fall within the respective regions. Thereby, it is possible to particularly increase the amount of change in resistance values of piezoresistive elements 7a, 7b, 7c, and 7d associated with pressure applied to a pressure receiving surface 24a and to further improve the detection sensitivity of the physical quantity sensor 1.

Also in the second embodiment, it is possible to exhibit the same effects as those in the above-mentioned first embodiment.

Third Embodiment

Next, a physical quantity sensor according to a third embodiment of the invention will be described.

Figure 15:
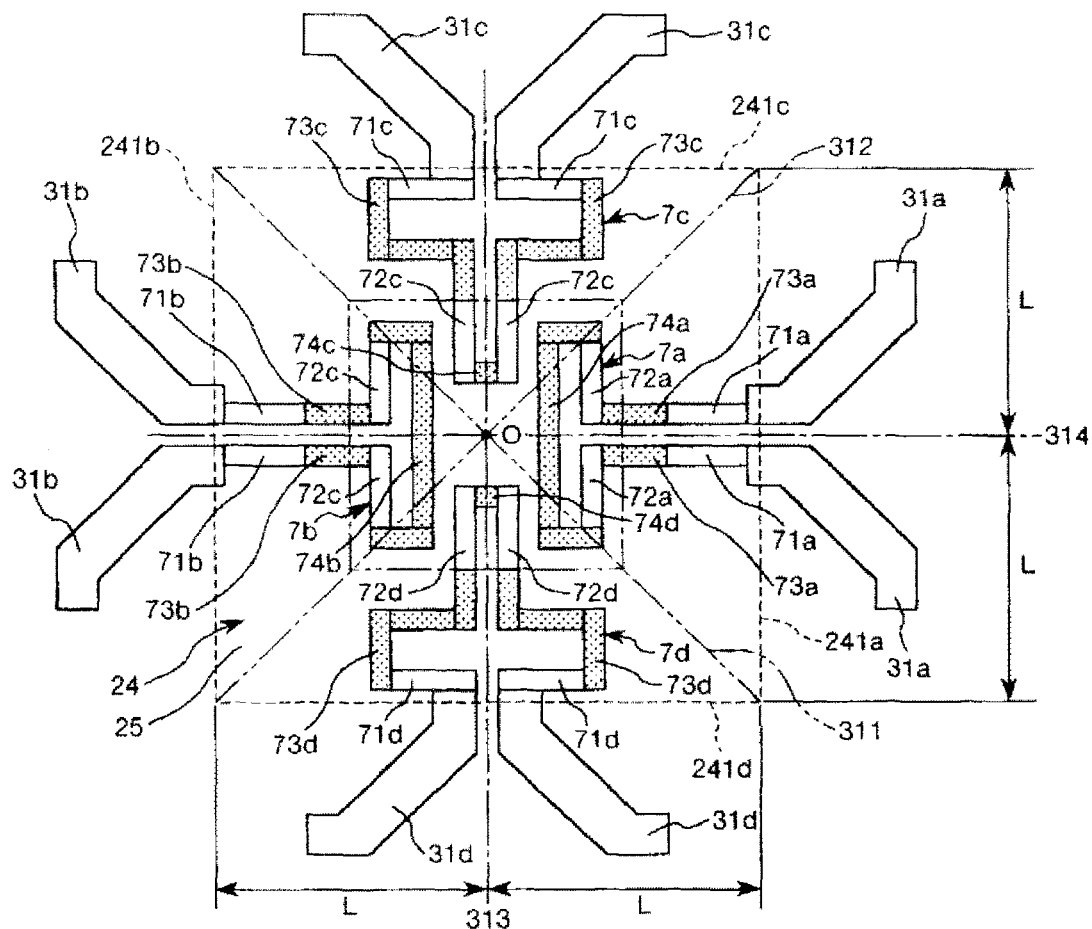
FIG. 15 is a cross-sectional view showing a physical quantity sensor according to a third embodiment of the invention.

FIG. 15 is a cross-sectional view of the physical quantity sensor according to the third embodiment of the invention.

Hereinafter, the physical quantity sensor according to the third embodiment of the invention will be described, but a description will be given with focus on differences from the above-mentioned embodiments, and common particulars will not be described below.

The third embodiment is the same as the first embodiment, except that the configuration of a sensor element 7 is different from the above one.

Specifically, in the sensor element 7 included in the physical quantity sensor 1 shown in FIG. 15, the arrangement of center side piezoresistive portions 72a and 72b, and the like are different from those in the first embodiment.

As shown in FIG. 15, the center side piezoresistive portion 72a is provided closer to the edge portion (closer to a side 241a) than the center side piezoresistive portion 72a of the first embodiment.

In addition, a connection portion 73a connecting the center side piezoresistive portion 72a and an edge portion side piezoresistive portion 71a has an approximately I shape. One end of the connection portion 73a is connected to an end of the edge portion side piezoresistive portion 71a, and the other end thereof is connected to a side surface closer to an end of the center side piezoresistive portion 72a.

In addition, the pair of center side piezoresistive portions 72a are connected to each other by a connection portion 74a having an approximately U shape. The connection portion 74a is constituted by a portion which is located closer to a center O side than the center side piezoresistive portion 72a and extends along a direction parallel to the side 241a and a portion which connects both ends of the above-mentioned portion to the center side piezoresistive portion 72a and extends along a direction perpendicular to the side 241a.

In addition, similarly to the center side piezoresistive portion 72a, the center side piezoresistive portion 72b is provided closer to the edge portion than the center side piezoresistive portion 72b of the first embodiment. In addition, similarly to the connection portion 73a, a connection portion 73b has an approximately I shape and connects the center side piezoresistive portion 72b and an edge portion side piezoresistive portion 71b to each other. In addition, similarly to the connection portion 74a, a connection portion 74b has an approximately U shape and connects the pair of center side piezoresistive portions 72b to each other.

In addition, side surfaces closer to ends of center side piezoresistive portions 72c which are different from ends connected to connection portions 73c are connected to each other through a connection portion 74c.

In addition, similarly to the center side piezoresistive portions 72c, side surfaces closer to ends of center side piezoresistive portions 72d which are different from ends connected to connection portions 73d are connected to each other through a connection portion 74d.

In the sensor element 7 of this embodiment, as described above, the center side piezoresistive portions 72a and 72b are disposed closer to the edge portion side of a diaphragm 24 than the center side piezoresistive portions 72a and 72b included in the sensor element 7 of the first embodiment. Therefore, it is possible to more reliably make the center side piezoresistive portions 72a and 72b fall within the respective regions. In addition, as shown in FIG. 5, as a distance between the center side piezoresistive portions 72a and 72b and the center O increases, relative stress P is decreased (stress P relative to initial stress becomes smaller). However, it is possible to further increase the lengths of the center side piezoresistive portions 72a and 72b in the longitudinal direction while making the center side piezoresistive portions 72a and 72b fall within the respective regions by separating the center side piezoresistive portions 72a and 72b from the center O. Therefore, it is possible to further increase the amount of change in the resistance values of the piezoresistive elements 7a and 7b and to further improve the detection sensitivity of the physical quantity sensor 1.

Also in the third embodiment, it is possible to exhibit the same effects as those in the above-mentioned first embodiment.

Fourth Embodiment

Next, a physical quantity sensor according to a fourth embodiment of the invention will be described.

Figure 16:
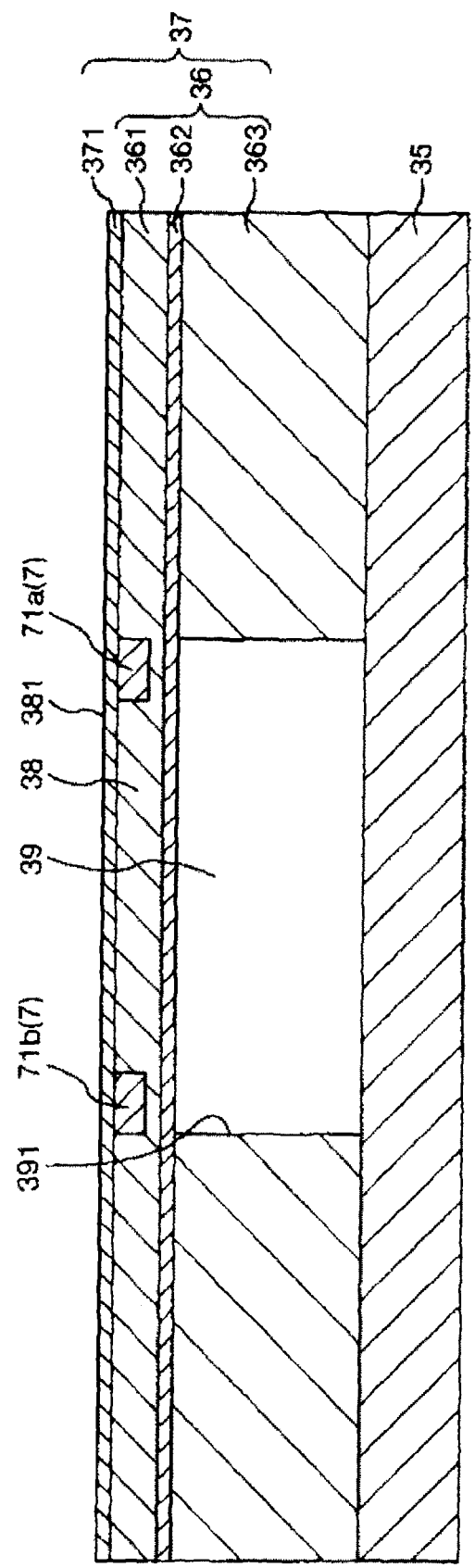
FIG. 16 is a cross-sectional view showing a physical quantity sensor according to a fourth embodiment of the invention.

FIG. 16 is a cross-sectional view of the physical quantity sensor according to the fourth embodiment of the invention.

Hereinafter, the physical quantity sensor according to the fourth embodiment of the invention will be described, but a description will be given with focus on differences from the above-mentioned embodiments, and common particulars will not be described below.

The fourth embodiment is the same as the first embodiment, except that the configurations of a substrate defining a hollow portion and an element surrounding structure, and the like are different from the above ones.

The physical quantity sensor 1 shown in FIG. 16 includes a substrate 35, a sensor element 7, a structure (element surrounding structure) 37, and a hollow portion 39.

Hereinafter, these portions will be sequentially described.

The substrate 35 has a plate shape and is formed of, for example, single crystal silicon. The structure 37 is provided on one surface side of the substrate 35.

The structure 37 is formed by laminating a semiconductor substrate 36, which is constituted by an SOI substrate (substrate on which a first Si layer 361, an $SiO_2$ layer 362, and a second Si layer 363 are laminated in this order), and a passivation film 371 provided on the semiconductor substrate 36.

In addition, a concave portion 391 is formed in the structure 37 by removing a portion of the second Si layer 363. A portion which is thin-walled due to the concave portion 391 constitutes a diaphragm 38 which is bent and deformed by pressure reception, and the upper surface side of the structure 37 serves as a pressure receiving surface 381.

In addition, a hollow portion 39 formed by closing the opening of the concave portion 391 of the structure 37 by the substrate 35 functions as a reference pressure chamber.

In addition, the sensor element 7 is formed in the first Si layer 361 of the semiconductor substrate 36.

In the physical quantity sensor 1 having such a configuration, the diaphragm 38 is bent and deformed toward the lower side in FIG. 16 (the substrate 35 side) in accordance with pressure received in the pressure receiving surface 381. Similarly to the first embodiment, also in the physical quantity sensor 1, it is possible to obtain the magnitude of the pressure received in the pressure receiving surface 381 on the basis of changes in the resistance values of the piezoresistive elements 7a, 7b, 7c, and 7d which are associated with the deformation of the diaphragm 38.

Also in the fourth embodiment, it is possible to exhibit the same effects as those in the above-mentioned first embodiment.

2. Altimeter

Figure 17:
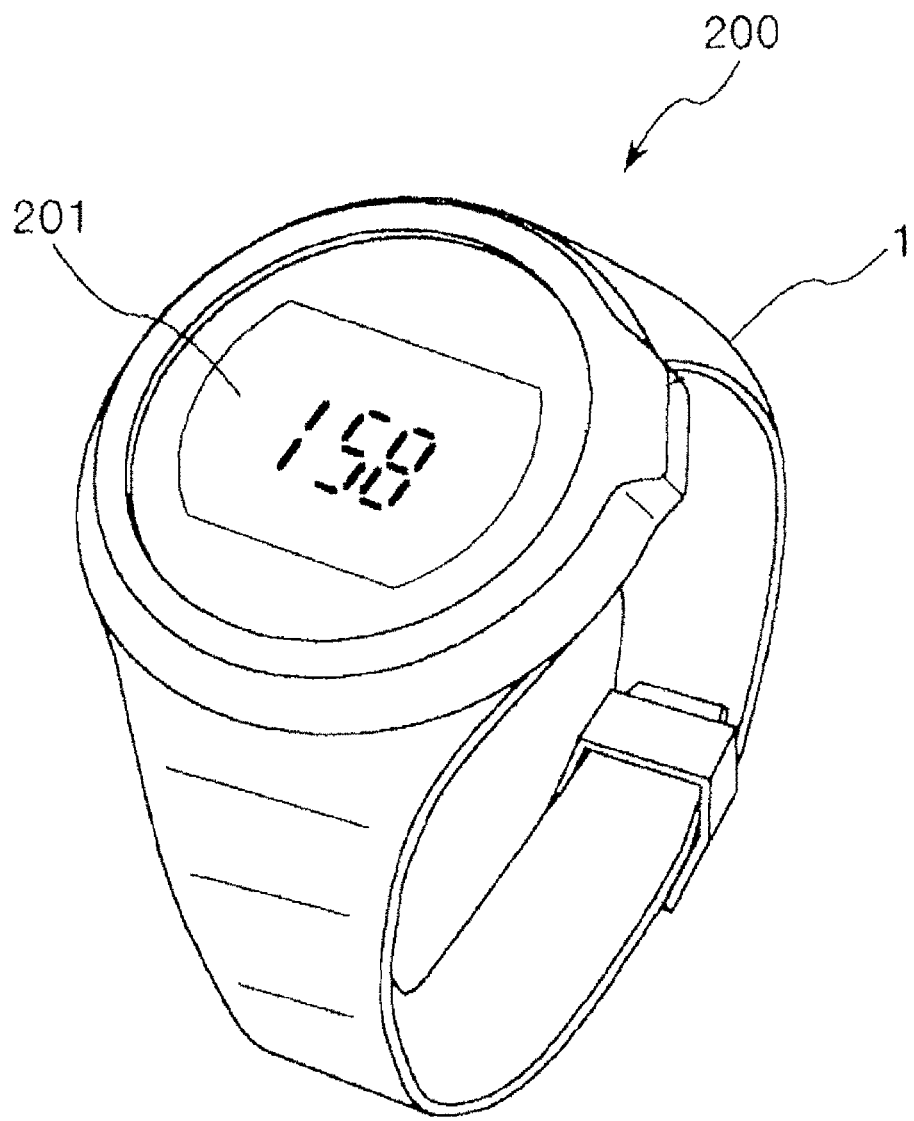
FIG. 17 is a perspective view showing an example of an altimeter according to the invention.

Next, an example of an altimeter (altimeter according to the invention) including the physical quantity sensor according to the invention will be described. FIG. 17 is a perspective view illustrating an example of the altimeter according to the invention.

An altimeter 200 can be worn on a wrist like a watch. In addition, the altimeter 200 has the physical quantity sensor 1 mounted therein, and can display the altitude from the height above sea level of a present location, the air pressure of a present location, or the like, on a display portion 201.

Meanwhile, various information such as the current time, the heart rate of a user, the weather, and the like can be displayed on this display portion 201.

3. Electronic Apparatus

Figure 18:
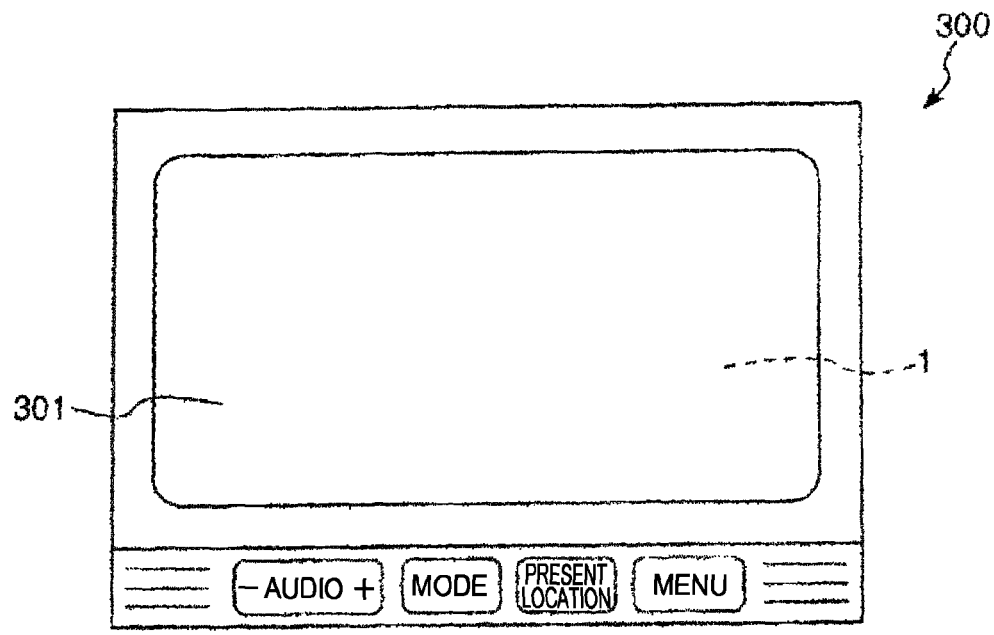
FIG. 18 is a front view showing an example of an electronic apparatus according to the invention.

Next, a navigation system to which an electronic apparatus including the physical quantity sensor according to the invention is applied will be described. FIG. 18 is a front view illustrating an example of an electronic apparatus according to the invention.

A navigation system 300 includes map information (not shown), a positional information acquisition unit from a global positioning system (GPS), a self-contained navigation unit based on a gyro sensor, an acceleration sensor and vehicle speed data, the physical quantity sensor 1, and the display portion 301 that displays predetermined positional information or course information.

According to this navigation system, altitude information can be acquired in addition to the acquired positional information. In the case of obtaining the altitude information and thus, for example, traveling along a high-level road indicating substantially the same position as that of an ordinary road on the positional information, or when there is no altitude information, whether traveling along an ordinary road or whether traveling along a high-level road is not able to be determined in the navigation system, and information of an ordinary road is provided to a user as priority information. Thus, in the navigation system 300 according to the present embodiment, the altitude information can be acquired by the physical quantity sensor, and navigation information in a traveling condition of a high-level road can be provided to a user by detecting a change in altitude caused by entry from an ordinary road to a high-level road.

Meanwhile, the display portion 301 is formed of, for example, a liquid crystal panel display, an organic electroluminescence (EL) display, or the like which can have reduced size and thickness.

Meanwhile, the electronic apparatus including the physical quantity sensor according to the invention is not limited to the above examples, and can be applied to, for example, a personal computer, a cellular phone, medical instruments (for example, an electronic thermometer, a sphygmomanometer, a blood glucose monitoring system, an electrocardiogram measurement device, an ultrasound diagnostic device, and an electronic endoscope), various types of measuring apparatuses, meters and gauges (for example, meters and gauges of a vehicle, an airplane, and a vessel), a flight simulator, and the like.

4. Moving Object

Figure 19:
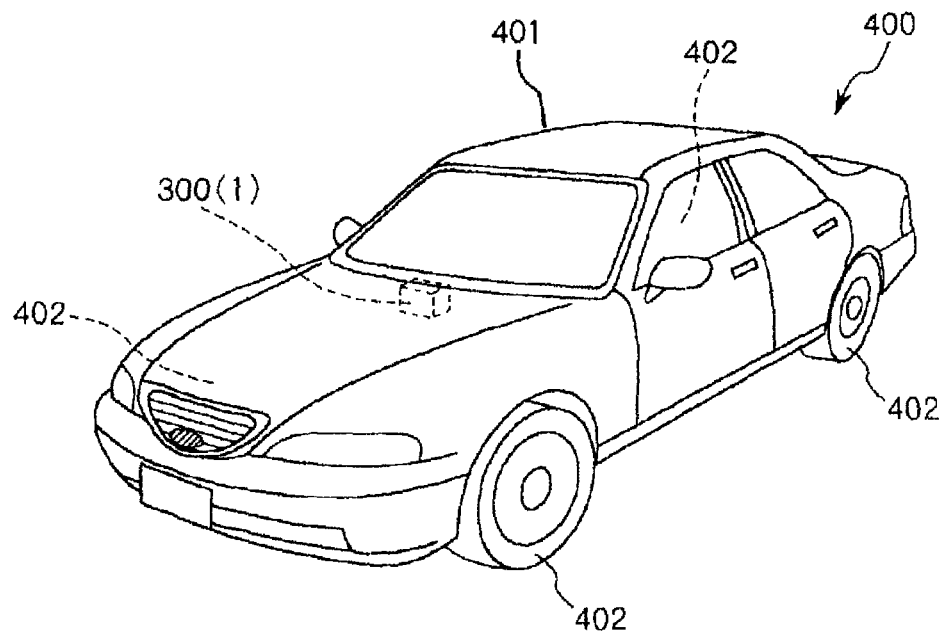
FIG. 19 is a perspective view showing an example of a moving object according to the invention.

Next, a moving object (moving object according to the invention) to which the physical quantity sensor according to the invention is applied will be described. FIG. 19 is a perspective view illustrating an example of the moving object according to the invention.

As shown in FIG. 19, a moving object 400 includes a car body 401 and four wheels 402, and is configured to rotate the wheels 402 using a motive power source (engine), not shown, which is provided in the car body 401. The navigation system 300 (physical quantity sensor) is built into such a moving object 400.

As stated above, the physical quantity sensor, the altimeter, the electronic apparatus and the moving object according to the invention have been described on the basis of each of the illustrated embodiments, but the invention is not limited thereto, and the configuration of each portion can be replaced by any configuration having the same function. In addition, any other configurations or processes may be added.

In the above-mentioned embodiments, a case where a piezoresistive element is used as a sensor element has been described as an example, but the invention is not limited thereto. For example, other MEMS vibrators such as a flap-type vibrator and an inter digital transducer or vibration elements such as a crystal vibrator can be used.

In the above-mentioned embodiments, a case where four sensor elements are used has been described as an example, but the invention is not limited thereto. The number of sensor elements may be one or more and three or less or may be five or more.

In the above-mentioned first embodiment, a case where a sensor element is disposed on a surface side opposite to a pressure receiving surface of a diaphragm has been described, but the invention is not limited thereto. For example, the sensor element may be disposed on the pressure receiving surface side of the diaphragm or may be disposed on both surfaces of the diaphragm.

In the above-mentioned embodiments, a case where a sensor element is disposed on an outer peripheral portion side of a diaphragm has been described as an example, but the invention is not limited thereto. The sensor element may be disposed in a center portion of the diaphragm.

The entire disclosure of Japanese Patent Application No. 2014-062778, filed Mar. 25, 2014 is expressly incorporated by reference herein.

What is claimed is:

1. A physical quantity sensor comprising:
a diaphragm which is able to be bent and deformed; and
a piezoresistive element provided in the diaphragm,
wherein the piezoresistive element includes a center side element which is provided closer to the center of the diaphragm and an edge portion side element which is provided closer to an edge of the diaphragm than the center side element, and the center side element and the edge portion side element are connected via a connection portion, and
wherein the center side element and the edge portion side element have a rectangular shape when seen in a plan view, and a longitudinal direction of the center side element and a longitudinal direction of the edge portion side element are perpendicular to each other.

2. The physical quantity sensor according to claim 1, wherein the center side element and the edge portion side element are provided lined up toward the edge portion from the center of the diaphragm.

3. The physical quantity sensor according to claim 2, wherein when the amount of bending deformation of the diaphragm is changed, magnitudes of stresses detected by the center side element and the edge portion side element are changed in mutually opposite directions.

4. The physical quantity sensor according to claim 1, wherein when a distance between the center of the diaphragm and an outer edge of the diaphragm is set to be L, the center side element is located within a range of equal to or less than 2L/3 from the center of the diaphragm.

5. The physical quantity sensor according to claim 1, wherein when a distance between the center of the diaphragm and an outer edge of the diaphragm is set to be L, the center side element is located within a range of equal to or greater than L/4 and equal to or less than L/2 from the center of the diaphragm.

6. The physical quantity sensor according to claim 1, wherein the diaphragm has a quadrangular shape when seen in a plan view, and at least one center side element and at least one edge portion side element are provided within at least one of four regions separated by two diagonal lines.

7. The physical quantity sensor according to claim 6, wherein at least one center side element and at least one edge portion side element are provided within each of the four regions.

8. The physical quantity sensor according to claim 1, wherein the center side element and the edge portion side element have a longitudinal shape when seen in a plan view, and a longitudinal direction of the center side element and a longitudinal direction of the edge portion side element intersect each other.

9. The physical quantity sensor according to claim 1, wherein the center side element and the edge portion side element have a longitudinal shape when seen in a plan view, and a length of the center side element in a longitudinal direction is shorter than a length of the edge portion side element in a longitudinal direction.

10. The physical quantity sensor according to claim 1, wherein the physical quantity sensor is a pressure sensor that detects pressure.

11. An altimeter comprising the physical quantity sensor according to claim 1.

12. An electronic apparatus comprising the physical quantity sensor according to claim 1.

13. A moving object comprising the physical quantity sensor according to claim 1.

14. A physical quantity sensor comprising:
a substrate, an annular wall, and a cover defining a hollow portion; a diaphragm formed in the substrate and defining the hollow portion, wherein the diaphragm is bent and deformed in response to pressure acting on the diaphragm; and
at least one piezoresistive element provided in the diaphragm, wherein the at least one piezoresistive element outputs a signal indicating an amount of diaphragm deformation,
wherein each piezoresistive element includes a pair of inner piezoresistive portions which are provided closer to a center of the diaphragm and a pair of outer piezoresistive portions which are provided closer to an edge of the diaphragm than the inner piezoresistive portions,
wherein the pair of inner piezoresistive portions extend either along a same axis or parallel to each other and the pair of edge portion side elements extend the other of along the same axis or parallel to each other,
wherein one of the pair of inner piezoresistive portions and one of the pair of outer piezoresistive portions are connected via a connector and the other of the pair of inner piezoresistive portions and the other of the pair of outer piezoresistive portions are connected via a connectors, and
wherein the inner piezoresistive portions and the outer piezoresistive portions have a rectangular shape when seen in a plan view, and a longitudinal direction of the inner piezoresistive portions and a longitudinal direction of the outer piezoresistive portions are perpendicular to each other.

* * * * *